US008771407B2

(12) United States Patent
Johnsgard et al.

(10) Patent No.: US 8,771,407 B2
(45) Date of Patent: Jul. 8, 2014

(54) MOMENTUM TRANSFER USING LIQUID INJECTION

(75) Inventors: Mark Johnsgard, Campbell, CA (US); Kris Johnsgard, Los Gatos, CA (US)

(73) Assignee: Kristian E. Johnsgard, Los Gatos, CA (US)

(*) Notice: Subject to any disclaimer, the term of this patent is extended or adjusted under 35 U.S.C. 154(b) by 295 days.

(21) Appl. No.: 13/209,929

(22) Filed: Aug. 15, 2011

(65) Prior Publication Data

US 2012/0037003 A1 Feb. 16, 2012

Related U.S. Application Data

(60) Provisional application No. 61/344,529, filed on Aug. 16, 2010.

(51) Int. Cl.
*B01D 47/06* (2006.01)

(52) U.S. Cl.
USPC ............. 96/244; 261/115; 261/116; 261/117; 261/118; 96/322

(58) Field of Classification Search
USPC ................................................ 261/115–118
See application file for complete search history.

(56) References Cited

U.S. PATENT DOCUMENTS

| | | | | |
|---|---|---|---|---|
| 1,964,357 | A | 6/1934 | Ketterer | |
| 3,225,522 | A | 12/1965 | Black | |
| 7,150,412 | B2 * | 12/2006 | Wang et al. | 239/102.1 |
| 2010/0068111 | A1 | 3/2010 | Walsh, Jr. | |
| 2010/0090034 | A1 * | 4/2010 | Stretch | 239/585.5 |

FOREIGN PATENT DOCUMENTS

| | | | | |
|---|---|---|---|---|
| DE | 10040015 A1 | 2/2002 | | |
| EP | 0674946 A1 | 10/1995 | | |
| GB | 1546180 A * | 5/1975 | | B01D 47/06 |
| GB | 1546180 * | 5/1979 | | B01D 47/06 |
| GB | 1546180 A | 5/1979 | | |
| WO | WO2008042554 A1 | 4/2008 | | |

OTHER PUBLICATIONS

Paxman History Pages (Richard Carr). A Glossary of Diesel Terms. Wayback Machine Archive Jul. 17, 2009. Accessed Aug. 23, 2013, Aug. 26, 2013.*

International Search Report prepared by European Patent Office for copending PCT application No. PCT/US2011/047774, Jul. 2012.

(Continued)

*Primary Examiner* — Duane Smith
*Assistant Examiner* — Joubert X Glover
(74) *Attorney, Agent, or Firm* — Bresbo AB

(57) ABSTRACT

Various apparatus provide for spraying high velocity droplets of liquid into a low velocity gas stream. Finely atomized droplets may quickly transfer their momentum to the gas, resulting in deceleration of the spray and acceleration of the gas. A high velocity spray of atomized liquid may transfer a substantial fraction of its kinetic energy to the gas before contacting a surface, in some aspects, suspended particles in the gas phase may be removed by high velocity liquid droplets passing through the gas. Certain aspects provide for controlling a gas flow by controlling the relative amounts of upstream and downstream momenta transferred to the gas by one or more liquid sprays.

37 Claims, 14 Drawing Sheets

(56) References Cited

OTHER PUBLICATIONS

Pollock, D. & Organiscak, J., "Airborne Dust Capture and Induced Airflow of Various Spray Nozzle Designs," Aerosol Sci Tech Jul. 2007; 41(7):711-720, available at http://www.cdc.gov/niosh/mining/works/coversheet232.html (Jul. 2007).

International Preliminary Report on Patentability prepared by European Patent Office for copending PCT application No. PCT/US2011/047774, Feb. 2013.

Response to Communication pursuant to Rules 161(1) and 162 EPS, communicated by EPO in European Patent Application No. 11749300.7-1356 in copending European Patent Application No., Sep. 2013.

* cited by examiner

MOMENTUM TRANSFER USING LIQUID INJECTION

CROSS REFERENCE TO RELATED APPLICATIONS

This description claims the priority benefit of U.S. Provisional Patent Application No. 61/344,529, filed Aug. 16, 2010, the disclosure of which is incorporated herein by reference.

BACKGROUND

1. Technical Field

The present invention relates generally to injecting liquids into gases, and more particularly to spraying liquids into gases at large velocity differences between the gases and sprayed liquids.

2. Description of Related Art

Gas streams from various industrial processes may contain contaminants, such as dissolved species, suspended particulates, and/or other materials (hereinafter: particles). Removal of particles prior to the release of a gas stream to the environment may be required. Some particles may be difficult to remove. Small particles (e.g. below limn, below 100 microns, below 10 microns, below 1 micron, below 1.00 nm, or even below 10 nm) may be especially difficult to remove. In some applications, particles impinging upon or otherwise interacting with a surface may create deposits, which can impede the operation of the apparatus having the particles deposited thereon.

Some processes benefit from controlling a flow rate of a gas stream. Some processes benefit from controlling a pressure associated with a gas stream (e.g., a backpressure). Some gas streams may form deposits on control apparatus, which may impair the ability of the apparatus to control the gas stream.

Some processes create gas streams having suspended particles. Some such processes benefit from precise control of flow rates, pressures, and the like, and may benefit from control of the flow rate and/or pressure drop associated with the particle-laden gas stream. A particle-laden gas stream may be difficult to control, particularly when particles impinge on and/or attach to various mechanisms that control the gas stream. In some cases, a particle-laden gas stream may clog the apparatus that controls flow rate.

Some processes, such as semiconductor processes, may create gas streams that require scrubbing. Scrubbing may include the use of liquids, such as water, which may react with a gas stream. In some cases, reaction with a gas stream creates particles (e.g., $SiO_2$, $TiO_2$, $NH_4Cl$, and the like) which must be removed before being released to the environment. Some reactions create particles, and so subsequent scrubbing applications may benefit from a removal of these particles prior to scrubbing. A wet scrubber may remove some contaminants from a gas stream. For a gas stream containing small particles and a contaminant that reacts with water, scrubbing the gas stream in a wet scrubber may make removal of the particles difficult.

SUMMARY OF THE INVENTION

Various apparatus and methods are disclosed. Some embodiments include an apparatus comprising a chamber configured to contain a gas. The chamber may include one or more interior surfaces that contact the contained gas. The apparatus may include a liquid source configured to deliver a liquid (e.g., an aqueous liquid such as water) at a pressure. An injector coupled to the liquid source and the chamber may be configured to receive liquid from the liquid source and to inject the received liquid into the chamber.

The injector may include a nozzle having an orifice and a shape. The liquid source and injector may be configured to form a liquid spray upon being sprayed from the orifice into the chamber. The liquid spray may comprise a plurality of liquid droplets. The size of the orifice and the pressure of the liquid source may be configured to spray the liquid into the chamber at a spray velocity. An exemplary injector may include a nozzle having a shape that forms a fan shaped spray.

The chamber, the liquid source, and the injector may be configured such that a majority of droplets within the liquid spray decelerate from the spray velocity to a terminal spray velocity that is below 20%, below 10% or even below 1% of the spray velocity before contacting an interior surface or other liquid in the chamber. In some implementations, more than 80% of the spray decelerates to the terminal velocity prior to impinging upon a surface and/or another liquid. In some embodiments, the spray velocity may be greater than 100 feet per second, 200 feet per second, 400 feet per second, or even 600 feet per second. The terminal spray velocity may be less than 100 feet per second, less than 40 feet per second, less than 20 feet per second, less than 10 feet per second, less than 1 foot per second, or even less than 0.1 feet per second.

Some embodiments include an inner wall within the chamber. An inner wall may include a discrete surface. An inner wall may be a contiguous surface. An inner wall may form an inner chamber that is also configured to contain a gas. The inner chamber may include a gas inlet and/or outlet. A gas inlet or outlet may fluidically couple the inner chamber to a supply line. For example, a gas outlet from an inner chamber may connect to a tube passing through the outer chamber to an exit line, allowing gas to exit the inner chamber without interacting with gas in the outer chamber.

The inner wall may include a gap through with the spray may be injected, and the injector may be configured to inject the spray through the gap. A gap may include a tunnel or passage through the wall (hereinafter: throat) through which the spray may pass. In some embodiments, an outer chamber and an inner chamber (within the outer chamber) are in fluid communication via the gap. In some embodiments/the gap provides the only fluidic communication between the inner and outer chambers. A shape of the gap may be configured to substantially match a cross sectional shape of the spray (e.g., as measured at the gap). An elongated gap shape (e.g., having a long direction and a short direction) may be configured to match an expected cross sectional shape of a spray injected through the gap. In some examples, a fan shaped spray may be matched to an elliptical and/or rectangular gap having an aspect ratio similar to that of the spray. In some cases, a gap height may be twice a gap width, five times the gap width, ten times the gap width, twenty times the gap width, fifty times the gap width, or even 100 times the gap width. In some embodiments, gap is shaped like a cross, and a first spray has an elongated shape that is oriented to match one leg of the cross, and a second spray has an elongated shape that is oriented to match the other leg of the cross. The first and second sprays may intersect at the intersection of the legs of the cross. In some cases, the first spray is directed upstream and the second spray is directed downstream.

A substantial fraction of the spray may be directed through the gap. In some implementations, more than 60% of the spray, more than 80% of the spray, more than 90% of the spray, or even more than 97% of the spray passes through the gap. Certain embodiments include cylindrical outer and inner chambers, in fluidic communication via an elongated gap. An injector may inject a spray from the outer chamber into the inner chamber through the gap. In some cases, a long axis of the gap is aligned with the cylindrical axis of a chamber. In some cases, a long axis of the gap is aligned substantially orthogonally to the cylindrical axis. The long axis may be angled with respect to the cylindrical axis (e.g., at 45 degrees).

Some embodiments include a plurality of injectors, which may be configured to inject the same or different liquids (e.g., water, a solvent, a brine, and the like). Various methods and apparatus provide for controlling gas flow. In some cases, gas flow through a chamber may be controlled by "pushing" on the gas with an injected spray, which include controlling the momentum imparted to the gas by one or more liquid sprays. In some embodiments, an upstream spray imparts an upstream momentum to a gas (flowing downstream), and a downstream spray imparts a downstream momentum to the gas. Control of the relative magnitudes of upstream and downstream momenta may be used to control the flow of gas.

An apparatus may comprise a chamber configured to contain a gas. The chamber may have a gas inlet to deliver the gas into the chamber, and a gas outlet to convey the gas out of the chamber. A gas flow through the chamber may be characterized by a downstream direction from the gas inlet to the gas outlet, and an upstream direction from the gas outlet to the gas inlet. A first injector may be coupled to the chamber and configured to spray a first liquid into the chamber at a first velocity that imparts a downstream momentum to the gas in the chamber. A second injector may be coupled to the chamber and configured to spray a second liquid into the chamber at a second velocity that imparts an upstream momentum to the gas in the chamber. The first and second liquids may include the same liquid. The first and second liquids may be different liquids. A sensor may be coupled to the chamber, the first injector, the second injector, an injector mounting apparatus, a wall or surface associated with the apparatus, or elsewhere. The sensor may include a resistance or other electrical sensor, a temperature sensor, a flow sensor, a particle concentration or number sensor, an optical sensor, an acoustic sensor, a magnetic sensor, a id the like. The sensor may be configured to measure a control parameter associated with gas flow through the chamber. The control parameter may include a flow rate, temperature, contaminant level, (e.g., concentration of a dissolved chemical, particles, and the like). A controller may be coupled to the sensor and at least one of the first and second injectors and/or apparatus associated with controlling spray injection (e.g., injector mounts shutters, gaps, and the like). The controller may be configured to receive the control parameter and adjust at least one of the first velocity of the first liquid sprayed from the first injector and the second velocity of the second liquid sprayed from the second injector. The adjustment may be performed in response to a value of the received control parameter. In some embodiments, a threshold difference between desired and actual values may be used to define a range of operation, and the controller may make adjustments (e.g., adjust injectors) until a measured value of the control parameter differs from the desired value by less than the threshold.

An apparatus may comprise a chamber having a wall configured to contain a gas within the chamber. One or more throats through the wall may be configured to provide for fluidic communication between an exterior of the chamber and an interior of the chamber. An injector may spray a liquid through a throat (e.g., into a chamber). In some cases, a chamber has one throat and an injector sprays liquid into the chamber through the throat. Some chambers have several throats and injectors may spray liquid into or out of the chamber through the throats.

In some embodiments, an injector sprays a liquid into the chamber through the throat. The spray may be characterized by a spray direction going from the injector, through the throat, into the chamber. The spray may be characterized by a spray width (e.g., as measured at the front of the gap, the middle of the throat, the and of the throat, and the like) in a direction substantially orthogonal to the spray direction (e.g., within 30 degrees of, 20 degrees of, 10 degrees of, or even 5 degrees of orthogonal to the spray direction). The throat may be characterized by a throat length in the spray direction that is greater than the spray width. The throat length may be 2×, 5×, 10×, or even 20× greater than the spray width. In some cases, the throat length is less than the spray width.

The spray may also be characterized by a spray height (e.g., as measured at the front of the gap, the middle of the throat, the end of the throat, and the like) second direction substantially parallel to the spray direction. In some cases, the spray height is greater than the spray width, including 2×, 5×, 10×, or even 20× greater than the spray width. Some spray heights may be more than 100× greater than the spray width.

Spray height and spray width may be used to define an aspect ratio of a cross section of the spray (e.g., looking down the spray direction). The gap or throat may have an aspect ratio that is substantially the same as that of the spray as the spray passes through the throat. In some cases, the gap or throat has an aspect ratio that is within 50%, 30%, 20%, 10%, or even within 5% of the aspect ratio of the spray. The gap or throat may have a throat width that is within 50%, 30%, 20%, 10%, or even within 5% of the spray width. The gap or throat may have a gap or throat height that is within 50%, 30%, 20%, 10%, or even within 5% of the spray height.

A throat may appear fan shaped (e.g., for a fan shaped spray) as viewed substantially orthogonal to the spray direction. A throat may appear trapezoidal or even rectangular. According to an expected shape of the spray passing through the throat, the throat may be shaped to "match" the spray shape (e.g., as a glove matches a hand) such that the spray "fills" the throat as it passes through the throat.

In some cases, substantially all of the spray passes through the gap or throat, in some cases, some of the spray hits the chamber wall. In some cases, a majority, more than 70%, more than 80%, more than 90% or even more than 95% of the spray passes through the gap or throat.

DETAILED DESCRIPTION OF THE INVENTION

Figure 1:
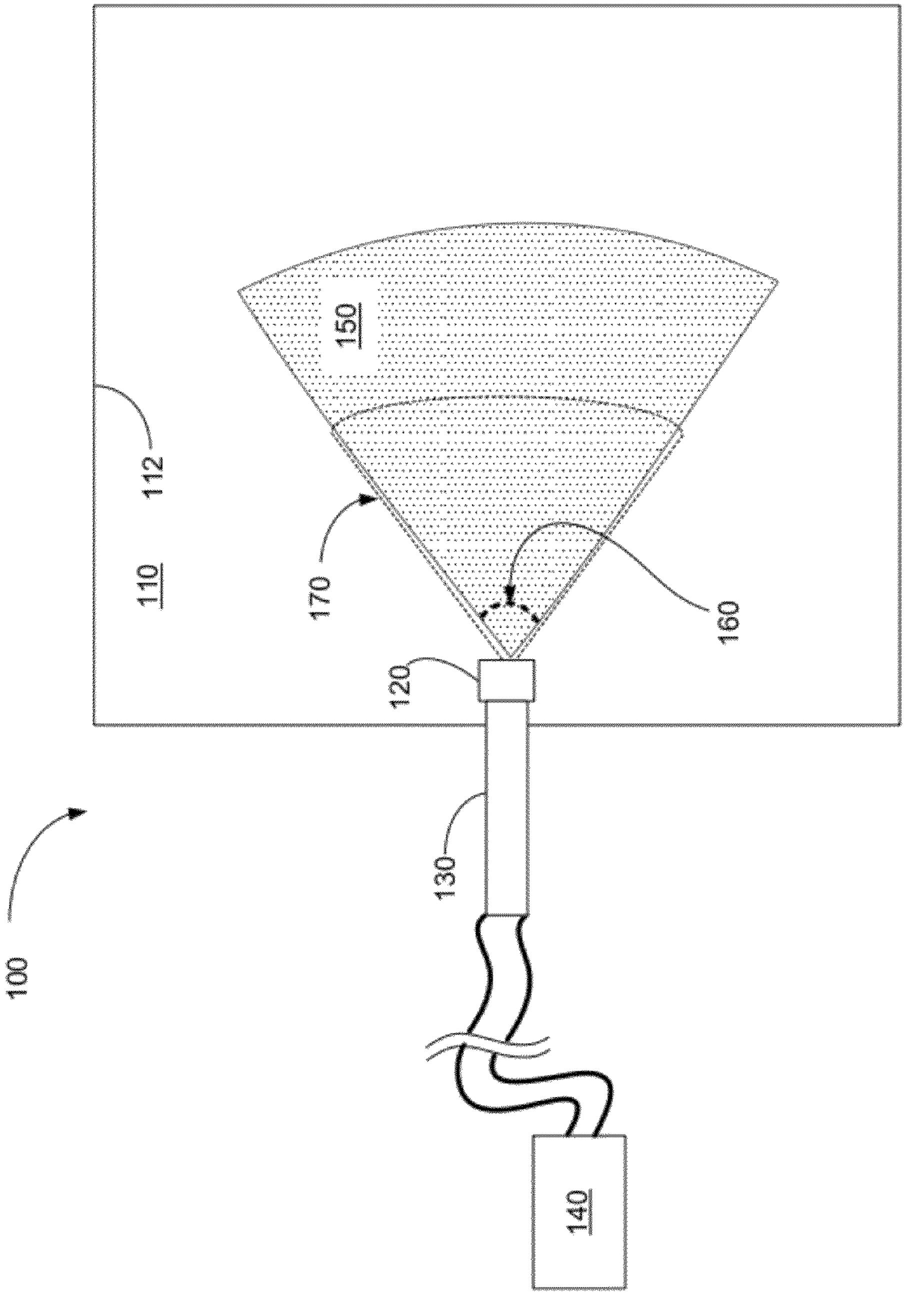
FIG. 1 is a diagrammatic representation of an apparatus, according to some embodiments.

Systems and methods for pushing on or otherwise transferring momentum from liquids to gases are described. In some embodiments, kinetic energy associated with a liquid is transferred to a gas by spraying the liquid into the gas at a velocity much higher than the local velocity of the gas. Atomization of the sprayed liquid may be combined with high injection velocities to result in a high velocity spray that rapidly decelerates upon interaction with the gas into which the liquid is sprayed. In some aspects, this process may be characterized as momentum transfer from the liquid to the gas. Momentum transfer, interfacial reactions, shear-induced phenomena, and the like may be enhanced by combining high velocity liquid (having high kinetic energy) injected as fine droplets (maximizing the areal contact between liquid and gas). As a result, large amounts of kinetic energy may be transferred from the liquid to the gas, which may yield a variety of useful phenomena.

In some embodiments, a spray of liquid passes through a gas stream whose velocity is constrained (e.g., with a pressure drop) to a value substantially lower than the initial velocity of the droplets passing through the gas. Such a constraint may reduce acceleration of the gas, which may increase the transfer of energy from the liquid to the gas (e.g., decelerate the liquid more effectively than if the gas were unconstrained). In some cases, a liquid is sprayed through a throat, and the sprayed liquid may create a pressure drop across the throat, such that pressure downstream of the throat is greater than pressure upstream of the throat. In some cases, a pressure difference on either side of the throat results from the constraints of a constant gas flow rate (through the throat) as modified by the sprayed liquid "pushing" the gas through the throat. A liquid spray may be used to control a pressure drop (e.g., in a controlled-flow rate system).

In some embodiments, momentum transfer is used to accelerate a gas stream and/or otherwise change a flow rate of the gas. A liquid spray may provide for controlling the flow of the gas stream by controlling the momentum transferred from the liquid to the gas (e.g., increasing spray velocity to push the gas faster). In some embodiments, very high shear fields (e.g., in the gas phase) at the droplet/gas interface may cause, enhance, or improve a desired reaction between the liquid and gas and/or particles.

Certain embodiments may be described as a "throttle body" type of gas control apparatus, in which the controlling apparatus that "throttles" the gas (the equivalent of the butterfly valve) is a gaseous cyclone that is controlled by injected liquid, rather than a solid plate or surface. For gas streams that tend to deposit on, corrode, or otherwise impede a control apparatus made from solid components (e.g., a plastic butterfly valve), control of the gas stream using a gaseous and/or liquid "throttle" may provide for longer usage before the need for cleaning, refurbishing, and the like. In some cases, increasing transfer of momentum from liquid to gas increases the angular velocity of a cyclone, which may increase a pressure drop across the cyclone a suction applied by the cyclone to a gas stream on one side of the cyclone, or a "push" applied by the cyclone to a gas stream on one side of the cyclone). By controlling the velocity of the cyclone (e.g., by controlling liquid injection), suction may be moderated, which may be used to control backpressure and/or flow rate of the gas stream. In some cases, a pressure drop between an inlet and outlet of a chamber may be controlled by controlling a first spray injected into the inlet (e.g., in a downstream direction and a second spray injected into the outlet (e.g., in an upstream direction). The sprays may be injected through throats in the chamber connecting the chamber to the respective inlet and outlet.

In some embodiments, a liquid spray injected into a gas stream at very high velocity may induce nonlinear behavior at the interface between an injected droplet and the gas within which the droplet travels. A fast droplet moving through a slow gas may sufficiently shear the gas (e.g., independent of momentum transfer) that a desired interaction between the liquid and gas occurs. In some cases, a fast moving droplet may cause a compression or shrinking of a gaseous boundary layer at the droplet/gas interface. A compressed boundary layer may result in increased reaction between the droplet and gas (e.g., between the droplet and a dissolved or suspended species in the gas). For an exemplary gas stream haying suspended particles, while a slow moving droplet might "push" particles out of the way via a gaseous boundary layer adjacent the droplet (leaving the particles in the gas stream), a fast moving droplet (e.g., moving at hundreds of feet per second relative to the gas) may remove particles from the gas into the liquid. Particle removal may be associated with the creation of high velocity differences between droplets and particles, which may induce high shear and/or normal forces at the interfaces between droplets of a sprayed liquid and a gas stream (in which the particles are suspended) into which the droplets are sprayed. For large differences between the velocities of droplets and gas (e.g., greater than 100 feet/second, greater than 200 feet per second, greater than 500 feet/second, greater than 1000 feet/second, or even greater than 5000 feet/second), droplets may interact with contaminants in the gas stream in an improved manner as compared to slower moving droplets.

Various embodiments provide for injecting (e.g., spraying) a liquid, at high velocity, into a gas stream. In general, gas streams may be controlled in various ways (e.g., to maintain a certain velocity, to maintain a certain pressure drop across a device, and the like), and so the effect induced by a spray on a gas stream may be manifest according to a control method and/or other imposed conditions. In some implementations, a spray may change a difference in gas pressure as measured between the "upstream" and "downstream" sides of the spray. In some implementations, a spray may increase a velocity of a gas stream, which may be an overall velocity of a gas stream and/or a local velocity of the gas stream in a volume proximate the spray. An initially large velocity difference between the sprayed liquid and the gas stream immediately after injection) may decrease as droplets within the sprayed liquid are slowed down by interaction with the gas. In some cases, momentum of the sprayed liquid may be transferred to the gas stream in a manner that accelerates the gas stream as the droplets of liquid decelerate. In some embodiments, a velocity of a gas stream may be controlled by controlling the transfer of momentum from an injected liquid to a gas into which the liquid is injected. An increase in momentum transfer (e.g., by increasing liquid velocity and/or volume) may be used to accelerate a gas stream. A decrease in momentum transfer may result in less acceleration of the gas stream. In an exemplary embodiment, a plurality of injectors are positioned, with respect to a gas stream, in a manner that provides for both "upstream" and "downstream" momentum transfer. A "downstream" inject injects a liquid in a manner that pushes the gas "downstream" and an "upstream" injector injects a liquid in a manner that pushes against the gas going "downstream." Control of upstream and/or downstream injectors may be used to control the flow (or pressure) of gas by adjusting the relative proportions of "upstream" and "downstream" momenta imparted to the gas by the injected liquids.

FIG. 1 is a diagrammatic representation of an apparatus, according to some embodiments. In an exemplary embodiment, system 100 includes a chamber 110, configured to contain a gas. Chamber 110 includes one or more interior surfaces 112 which contact the gas within chamber 110. An interior surface may include a wall of the chamber. An interior surface may be within the chamber (e.g., a discrete baffle within the chamber). An interior surface may be associated with another component (e.g., an inner chamber) within the chamber. Chamber 110 may provide a substantially "static" volume of gas. Chamber 110 may include a gas inlet and gas outlet (not shown), and gas flow from the gas inlet to gas outlet may be described as a gas stream flowing through chamber 110.

System 100 includes an injector 120. Injector 120 is coupled to chamber 110, and configured to inject a liquid into chamber 110. In exemplary system 100, injector 120 is coupled to chamber 110 via mount 130. Mount 130 may attach injector 120 to chamber 110. In some cases, mount 130 may provide for adjustment of injector 120 (e.g., fore, aft, left, right, up, down, axially, rotationally). In some embodiments, mount 130 may include actuation and/or other control mechanisms, and may include systems to perform input/output communication with a controller.

Injector 120 may receive a liquid from a liquid source 140. Liquid source 140 may be coupled to (e.g., in fluidic communication with) injector 120, and may provide a liquid to injector 120 that is injected into chamber 110 by injector 120. In some embodiments, liquid source 140 includes a pump. Certain embodiments include a high pressure pump, which may provide liquid at pressures above 100 psi, 1000 psi, or even 10,000 psi. Exemplary pumps include metallic pumping components (e.g., impellers, pistons, gears, tubes, and the like).

Injector 120 injects a liquid into chamber 110. In some embodiments, injector 120 is configured to spray the liquid into chamber 110. Injector 120 may include a nozzle (not shown), having a shape and an orifice that is configured, with the pressure of the liquid provided by liquid source 140, to inject a spray of atomized liquid droplets into chamber 110.

During operation, injector 120 may form a spray 150 of liquid droplets within chamber 110. Spray 150 may be a divergent spray, and may be characterized by at least one spray angle 160. In some embodiments, spray angle 160 is greater than 20 degrees, greater than 45 degrees, greater than 90 degrees, greater than 120 degrees, or even greater than 150 degrees. In some embodiments, spray 150 includes a fan shaped spray. In some embodiments, spray 150 includes a conical spray. Spray 150 may include a plurality of discrete sprays.

The droplets associated with spray 150 may have a first spray velocity at or immediately after injection into chamber 110. Sprayed droplets exact with the gas within chamber 110, and may be slowed down by the gas. Absent interaction with (e.g., hitting) a surface, sprayed droplets may decelerate, by interaction with the gas, until they reach a terminal velocity substantially similar to the local velocity of the gas at that position within the chamber (e.g., eventually the droplets may be carried by the gas, moving at the same velocity as the gas they are being carried by).

Various aspects provide for creating fast moving droplets in slowly moving (or relatively stagnant) gas streams. In that a gas stream may itself be moving (i.e., have its own velocity), this specification generally refers to velocity in the context of relative velocity between droplets and the gas through which those droplets are moving. The first velocity of an injected liquid describes the large difference in velocities between the injected droplets and the gas, immediately after injection by injector 120. The terminal velocity describes the difference in velocities between droplets and gas in a region relatively far away from injector 120, after the droplets have been substantially decelerated by be gas. For a particular interaction between the droplets and the gas e.g., a desired "push" on the gas, a desired momentum transfer, a desired velocity difference, a desired removal efficiency, and the like), the terminal velocity may be described as the velocity at which the droplets "have done what they were injected to do." Droplets may decelerate to a very small terminal velocity (e.g., be carried by the gas), notwithstanding that the gas stream carrying these droplets has a high velocity itself.

In some embodiments, the first velocity of spray 150 may be greater than 50 feet per second (fps), including greater than 100 fps. In some cases, the first velocity may be greater than 200 fps, 500 fps, 1,000 fps, 2,000 fps, or even greater than 5,000 fps. In some cases, a terminal velocity may be less than 50% of the first velocity, less than 20% of the first velocity, less than 10% of the first velocity, less than 5% of the first velocity, or even less than 1% of the first velocity. In some embodiments, a first spray velocity is greater than 100 feet per second, and the terminal velocity is less than 10 feet per second. In some embodiments, the first spray velocity is greater than 300 feet per second, and the terminal velocity is less than 3 feet per second, or even less than 0.5 feet per second. In some embodiments, the first velocity is greater than 600 feet per second, and the terminal velocity is less than 1 foot per second, or even less than 0.1 feet per second. In some embodiments, the first velocity is a velocity at which droplets are effective at removing particles from the gas through which they move, and the terminal velocity is a velocity at which the particles are substantially less effective at removing particles.

System 100 may include an open volume within which droplets within spray 150 decelerate from the first velocity to the terminal velocity. A deceleration zone 170 may describe a region, within this open volume, in which the sprayed liquid decelerates from the first velocity to the terminal velocity. The portion of spray 150 outside deceleration zone 170 may be comprised of droplets moving at substantially the same speed as the gas in that portion.

A large fraction (e.g., substantially all) of spray 150 may traverse deceleration zone 170 and decelerate to the terminal velocity prior to contacting a surface or another liquid within chamber 110. In some embodiments, chamber 110 and injector 120 are configured to generate a spray 150 of liquid droplets, the majority of which decelerate from the first velocity to the terminal velocity prior to contacting an interior surface within chamber 110. In some cases, more than 50%, more than 60%, more than 80%, more than 90%, more than 95%, or even more than 99% of spray 150 decelerates to the terminal velocity prior to contacting a surface or another liquid.

Figure 2:
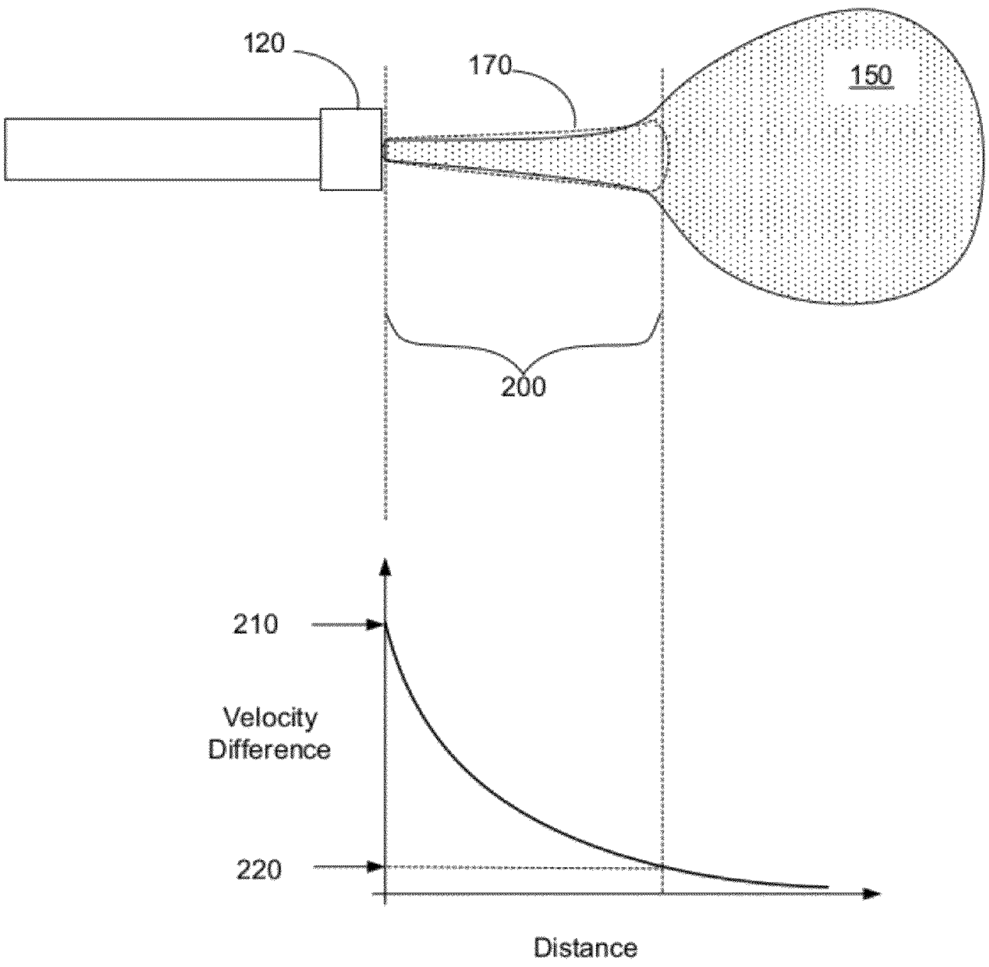
FIG. 2 is a diagrammatic representation of an injector and spray, along with a schematic illustration of velocity as a function of distance from the injector injecting the spray, according to some embodiments.

FIG. 2 is a diagrammatic representation of an injector and spray, along with a schematic illustration of velocity as a function of distance from the injector injecting the spray, according to some embodiments. The top part of FIG. 2 illustrates a view of a spray 150 created by an injector 120. In some cases, deceleration zone 170 may be at least partially defined by a deceleration distance 200, within which droplets of spray 150 decelerate from the first velocity to the terminal velocity. In some cases, the high initial velocity of droplets within deceleration zone 170 creates a relatively directional spray, with droplets substantially moving in the same direction. Outside deceleration zone 170, droplet movement may be dominated by convection, eddies, and/or turbulence in the gas, "brownian motion" types of random transport, and the like, resulting in droplet motion that may largely be dominated by motion of the gas phase in which the droplets are suspended.

The bottom part of FIG. 2 is a schematic illustration of velocity as a function of distance from an injector injecting a spray, according to some embodiments. In some embodiments, the representation of velocity as a function of distance (bottom of FIG. 2) characterizes the graphical representation of the spray 150 shown in the top part of FIG. 2. The bottom illustration in FIG. 2 may describe the differential velocity between the sprayed liquid droplets and the gas within which those droplets travel. Liquid may be sprayed at a high first velocity 210 which may decrease as the sprayed droplets are slowed down by the gas within the chamber. In some cases, velocity of the droplets decreases nonlinearly (e.g., exponentially, geometrically, with a square of distance, and the like). The deceleration distance 200 may be described as the distance at which most of the spray decelerates to the terminal velocity 220. In some embodiments, the deceleration zone 170 describes the region in which most (e.g., substantially all) of the momentum of the sprayed liquid is transferred to the gas (slowing the liquid while accelerating the gas).

An apparatus may include an open volume (e.g., without surfaces substantially impacted by the spray) within which the spray decelerates from the first velocity to the terminal velocity without contacting a surface. In some cases, a majority of the spray decelerates to the terminal vela for to contacting a surface. According to a desired degree of interaction between the spray and the gas (e.g., gas flow rate, particle concentration, particle removal rate, and the like), a desired spray volume, droplet size, spray velocity and the like may be used to determine an appropriate injector, liquid source, and the like. The desired degree of interaction may be used to determine a desired spray velocity, liquid volume, droplet size, and the like, which may be used to determine a deceleration distance. A chamber and injector may be designed to have an open volume around an expected deceleration zone associated with the injected spray.

in some embodiments, a high pressure liquid source (e.g. greater than 100 psi, greater than 500 psi, greater than 1,000 psi, greater than 2,000 psi, or even greater than 10,000 psi) may be combined with a small orifice (e.g., less than 0.05 square inches area, less than 0.01 square inches area, less than 0.005 square inches area, or even less than 0.003 square inches area). In some embodiments, a fan-shaped nozzle may be used. In certain implementations, an injector may create a liquid spray 150 that decelerates to a terminal velocity (demarcating an edge of deceleration zone 170) within three feet of injection, within 1 foot of injection, within 6 inches of injection, or even within 2 inches of injection. In some embodiments, a spray may decelerate to the terminal velocity within 10 inches, within 3 inches, within 1 inch, within 0.5 inches, or even within 0.1 inches of injection. The chamber, the liquid source, and the injector may be configured such that a portion of, greater than 20% of, a majority of, more than 80% of, more than 90% of, or even more than 99% of the droplets within the liquid spray decelerate from the initial spray velocity to the terminal spray velocity before contacting an interior surface or other liquid in the chamber. The terminal spray velocity may be below 70%, below 50%, below 20%, below 10% or even below 1% of the initial spray velocity.

Figure 3A:
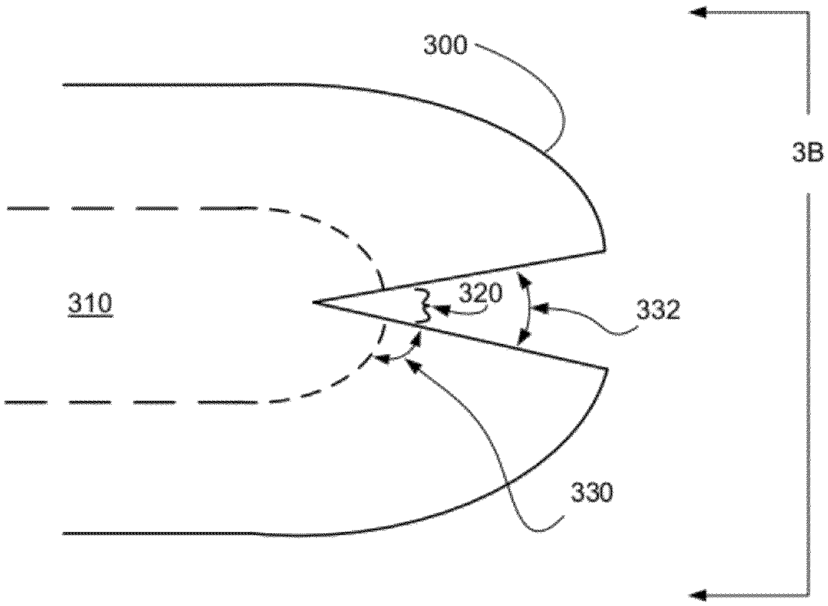
FIG. 3A is a diagrammatic representation of one view of a nozzle, according to some embodiments.

FIG. 3A is a diagrammatic representation of one view of a nozzle, according to some embodiments. Nozzle 300 may be incorporated into an injector, such as an injector 120. Exemplary nozzle 300 may have a shape configured to generate a fan-shaped spray, and may be described as a fan-shaped nozzle. Other nozzles may be used, and may be described by the shape of the spray they are configured to create (e.g., conical nozzles, helical nozzles, and the like).

Nozzle 300 may include a cavity 310 in fluidic communication with a liquid source. Liquid may exit cavity 310 via orifice 320. An area of orifice 320 may be chosen, along with the pressure and volume of liquid delivered by the liquid source, to yield a desired velocity and flow volume of a liquid sprayed from orifice 320. Nozzle 300 may include a shape that is configured to shear, compress, or otherwise redirect the liquid passing through the nozzle. In some cases, liquid entering the nozzle (e.g., via a tube) may be characterized by a first direction (e.g., parallel to the tube) and the nozzle forces the liquid to deviate from the first direction by more than 10 degrees, more than 20 degrees, more than 30 degrees, more than 45 degrees, or even more than 60 degrees. In some cases, various structures within nozzle 300 (e.g., walls, baffles, and the like) may impart significant shear forces to the liquid exiting orifice 320, which may induce fine atomization of the liquid into small droplets. In some cases, an interior angle 330 may be less than 180 degrees, less than 120 degrees, or even less than 90 degrees, which may cause the liquid to form fine droplets when sprayed at sufficient pressure. A nozzle may be characterized by an exit angle 332, which may guide or otherwise shape a spray in at least one dimension. An exit angle 332 may be less than 90 degrees, less than 20 degrees, less than 10 degrees, less than 5 degrees, or even less than 1 degree.

Figure 3B:
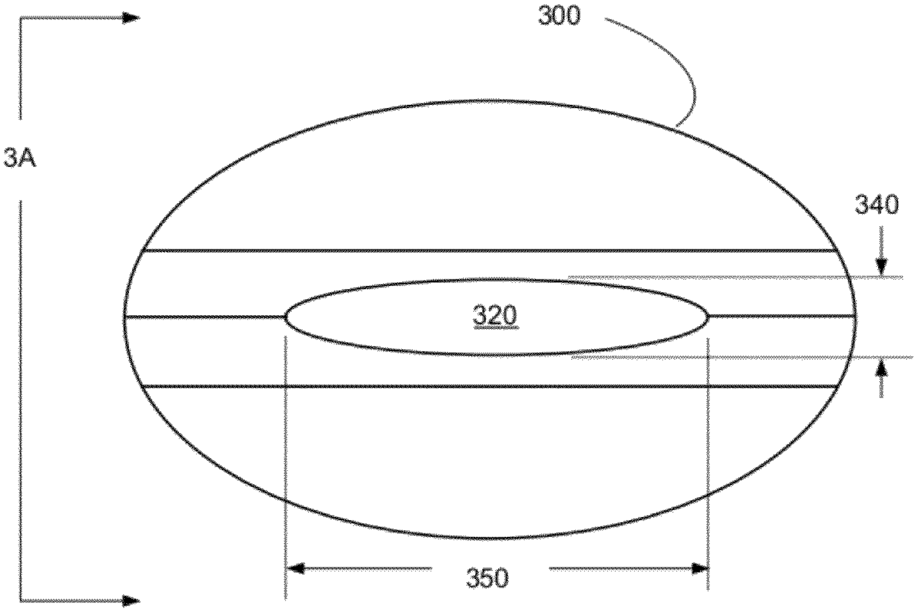
FIG. 3B is a diagrammatic representation of another view of the nozzle of FIG. 3A, according to some embodiments.

FIG. 3B is a diagrammatic representation of another view of the nozzle of FIG. 3A, according to some embodiments. Exemplary orifice 320 is an elliptical orifice, and may be characterized by a first length 340 that is less than a second length 350. First length 340 may be less than half of second length 350. First length 340 may be less than 20% of second length 350. First length 340 may be less than 10% of second length 350. In some embodiments, second length may be between 0.005 and 0.1 inches, between 0.012 and 0.09 inches, or between 0.03 and 0.08 inches. An orifice may be circular, square, rectangular, "S-shaped." and/or other shapes.

A nozzle may be configured (typically with the liquid source) to generate a spray of droplets of liquid. A desired droplet size (e.g., less than 1 mm mean diameter, less than 500 microns mean diameter, less than 100 microns mean diameter, less than 10 microns mean diameter, or even less than 1 micron mean diameter) may be generated by an appropriate choice of liquid pressure, nozzle orifice, and nozzle shape. In some embodiments, a liquid source providing greater than 1,000 psi may be combined with a nozzle having an orifice size that does not exceed 0.1 inches in its longest direction.

Some embodiments may be characterized by a ratio of pressure provided by the liquid source to orifice size of the nozzle. In some cases, pressure divided by orifice size may be greater than 500 psi/0.02 square inches. In some cases, pressure divided by orifice size may be greater than 1000 psi/0.01 square inches. For some embodiments, pressure divided by orifice size may be greater than 2000 psi/0.003 square inches.

Figure 4:
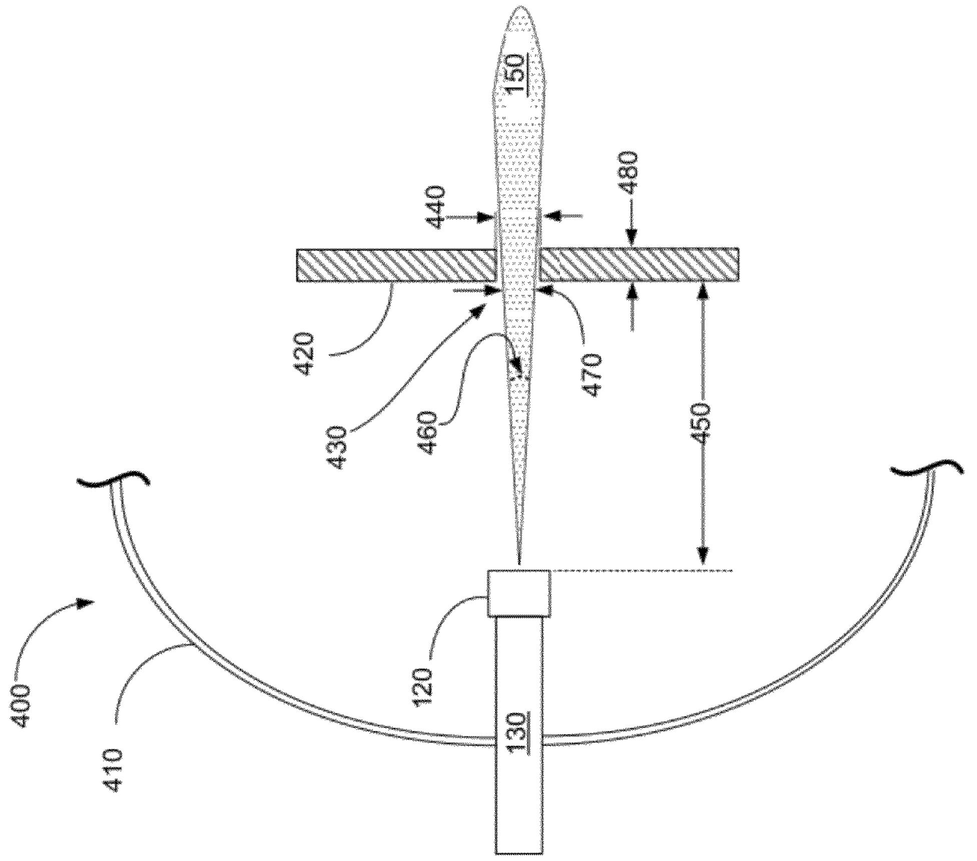
FIG. 4 is a diagrammatic representation of an apparatus, according to some embodiments.

FIG. 4 is a diagrammatic representation of an apparatus, according to some soiree embodiments. System 400 includes a chamber 410 (a portion which is shoe, in FIG. 4) that is configured to contain a gas. Chamber 410 may include a gas inlet and/or gas outlet (not shown). Injector 120 is coupled to chamber 410, and injects spray 150 into chamber 410. In some embodiments, chamber 410 includes one or more inner walls 420, which may be discrete (e.g., a baffle or other sheet) or contiguous (e.g., forming an inner chamber). An inner wall may be less than 1 cm thick, less than 5 mm thick, less than 1 mm thick, or even thinner. In some cases, an inner wall may be several cm thick, greater than 10 cm thick, or even greater than 100 cm thick. Inner wall 420 includes a gap 430 through inner wall 420. Gap 430 may be characterized by a gap width 440 (e.g., in a direction substantially orthogonal to a spray direction describing spray 150). Gap width 440 may include a diameter of a circular gap; gap width 440 may describe a "width" of an elongated gap. Gap width 440 may describe a portion of a gap (e.g., for an annular gap 430 and a conical spray 150 configured to pass through the annular gap). Injector 120 and gap 430 are configured such that injector 120 injects spray 150 through gap 430. Inner wall 420 is disposed a distance 450 from injector 120 (e.g., from the orifice associated with a nozzle of injector 120). In some embodiments, distance 450 is less than a deceleration distance 200 (FIG. 2) associated with liquid sprayed from the injector.

At least a portion of spray 150 may be configured, by appropriate choice of liquid source, injector mount, and injector design, to pass through gap 430. Substantially all of spray 150 may pass through gap 430 (e.g., without contacting inner wall 420). Some of spray 150 may contact inner will 420. A spray angle 460 may be chosen that results in a spray width 470 at distance 450 from injector 120. In some embodiments, a substantial portion of, a majority of, at least 90% of, or even substantially all of spray 150 passes through gap 430. Gap width 440, distance 450 and spray angle 460 may be chosen such that the spray width 470 is substantially the same as gap width 440 at inner wall 420 (e.g. such that the spray "fills" the gap as it passes through). In some cases, spray width 470 is slightly larger than gap width 440 (e.g., to clean the edges of the gap). In some cases, spray width 460 is slightly smaller than gap width 440 (e.g., to minimize the transfer of momentum from the liquid to inner wall 420). In some embodiments, a portion of spray 150 may impinge on inner wall 420. Spray width 470 may be within +/−50% of gap width 440, within +/−30% of gap width 440, within +/−10% of gap width 440, or even within +/−5% of gap width 440.

In some embodiments, distance 450 is less than a deceleration distance 200 (FIG. 2) associated with liquid sprayed from the injector, which may result in a substantial portion of spray 150 decelerating "on the other side" of inner wall 420 from injector 120. Gap 430 includes a gap depth 480 (through inner wall 420) through which spray 150 passes. Gap depth 480 may describe the "length" of the gap in the spray direction. In some apparatus (e.g., inner wall 420 is made from sheet-metal), gap depth 480 may be less than gap width 440. In some cases, gap depth 480 may be approximately the same as gap width 440. Gap depth 480 may be larger than gap width 440, including 2×, 3×, 5×, 10×, or even 20× larger. In such configurations, an interior surface of gap 430 may be described as a "throat" through which spray 150 passes.

in some configurations, a thickness of wall 420 defines gap depth 480. In some configurations, an extension or other feature (no shown) extends from the inner wall 420 in the spray direction (or the opposite direction), providing for an increased gap depth 480 as compared to the thickness of inner wall 420. In some cases, gap depth 480 may be approximately the same as spray width 470. Gap depth 480 may be larger than spray width 470, including 2×, 3×, 5×, 10×, or even 20× larger. Gap depth 480 may be less than a few mm. Gap depth 480 may be greater than a few mm, greater than 1 cm, or even greater than several cm in some cases. In some cases, the gap depth 480 may be greater than 1 foot long, or even several feet long. In select embodiments, a combination of distance 450 and gap depth 480 is chosen such that spray 150 decelerates to the terminal velocity within a throat through an inner wall (e.g., a throat defined by the interior of surfaces of the gap). In some embodiments, an expected size of various gaseous currents (e.g., eddies) is used to determine a size of gap depth 480 (which may be chosen to be larger than an expected diameter characterizing the predominant flow of an eddy current.

Inner wall 420 may reduce and/or prevent the creation of eddies within the gas, particularly in gaseous regions near deceleration zone 170 (not shown). Inner wall 420 may comprise a plate or otherwise discrete surface. The shape and size of inner wall 420 may be configured, using expected gas flow rates and vector fields describing flow directions, to result in a substantial portion of the gas being pushed through gap 430 by spray 150. Inner wall 420 may comprise a contiguous surface that creates an "inner chamber" into which injector 120 sprays liquid spray 150. In some embodiments, at least a majority of the gas within chamber 410 passes through gap 430. In some embodiments, over 90%, 95%, or even over 99% of the gas passes through gap 430.

Figure 5:
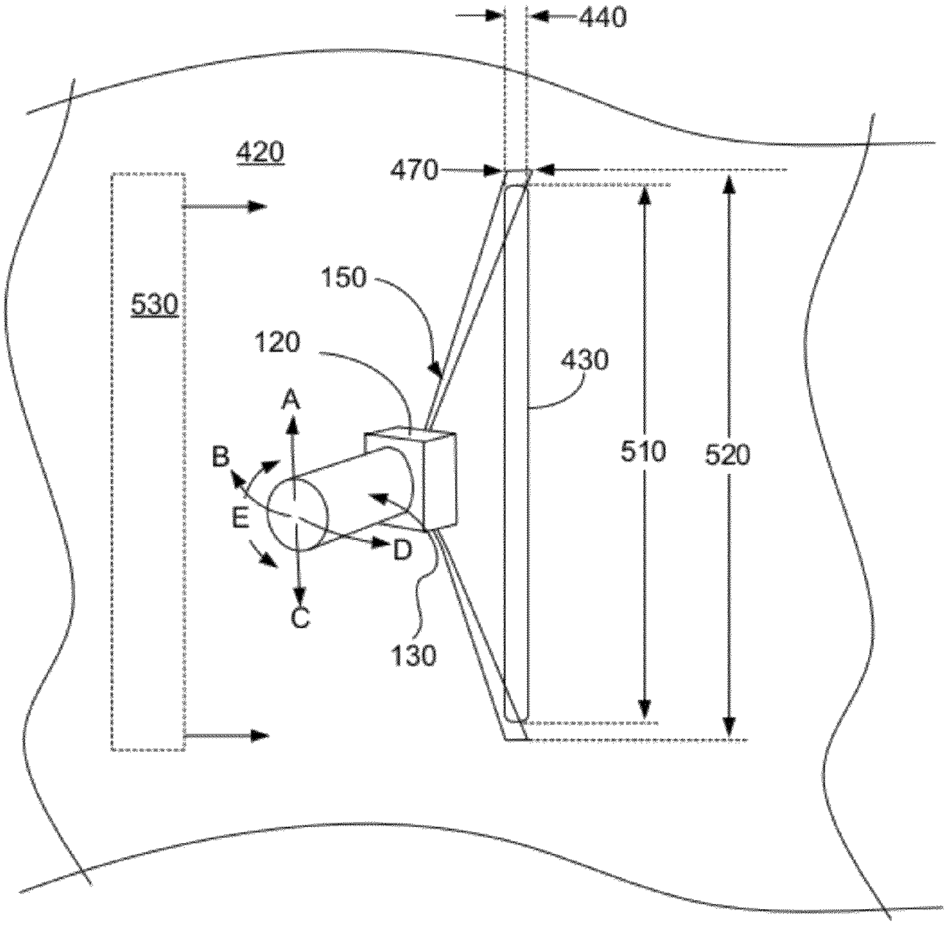
FIG. 5 is a perspective representation of an apparatus, according to some embodiments.

FIG. 5 is a perspective representation of an apparatus, according to some embodiments. In some aspects, FIG. 5 may be described as a perspective view of the "interior" of apparatus 400 (FIG. 4), facing the outside of inner wall 420, FIG. 5 illustrates an exemplary combination of an injector 120 configured to generate a fan shaped spray 150, and a gap 430 shaped to substantially "match" the shape of the spray at inner wall 420. Gap height 510 and gap width 440 may define an area of gap 430. Spray 150 may be configured to have a spray height 520 at inner wall 420. Spray height 520 and spray width 470 may be configured such that a majority, more than 70%, more than 90%, more than 95%, or more than 99% of spray 150 passes through gap 430.

FIG. 5 graphically illustrates exemplary lateral, radial, rotational, and vertical motions that may be incorporated into injector 120 (denoted A, B, C, D, E). In some embodiments, injector 120 may be configured to change an incident spray angle between spray 150 and inner wall 420. In some cases, incident spray angle may be adjusted in combination with adjustment of the position of injector 120 to result in an adjustability of the incident spray angle of spray 150 while still causing spray 150 to pass through gap 430. In some embodiments, injector 120 may be adjusted to direct spray 150 away from gap 430 (e.g., to "turn off" the flow of liquid through gap 430). Gas flow through gap 430 may be controlled by controlling the volume of liquid sprayed in spray 150, the velocity of liquid sprayed in spray 150, an angle of incidence associated with spray 150, and/or an amount of spray 150 that passes through gap 430. In some embodiments, two or more injectors 120 may each direct a spray 150 through the same gap 430. In some embodiments, an optional shutter 530 may be implemented. Shutter 530 may operate to close a gap 430 to passage of gas and/or liquid. In some implementations, shutter 530 allows passage through gap 430 when in an "open" on, and prevents passage through gap 430 when in a "closed" position. In some cases, shutter 530 may prevent passage of spray 150, while allowing passage of gas, through gap 430.

Injector 120 and/or mount 130 (FIG. 1) may be controlled to change (in some configurations) an amount of gas that passes through gap 430 or (in some configurations) a pressure drop across gap 430. For some configurations (e.g., in which gap 430 separates a gas inlet from a gas outlet), the area of gap 430 (e.g., gap height 510 multiplied by gap width 440, FIG. 4) and a gas flow rate from inlet to outlet may determine an expected gas flow rate through gap 430 (e.g., flow rate=area*velocity). In some configurations, inner wall 420 sealingly separates the gas inlet and gas outlet (not shown), such that the gas inlet and gas outlet are only in fluidic communication via gap 430. In a constant flow rate configuration, a flow rate of gas may go serially from the gas inlet through gap 430 to the gas outlet, and gas velocity (e.g., through the gap or throat) may be controlled by the gas flow rate and (e.g., divided by) the cross sectional area of gap 430 (e.g., gap width 440×gap height 510). Such constraints may create a maximum flow rate of gas through gap 430. In such configurations, a spray velocity higher than this maximum flow rate may increase the pressure drop between the gas inlet and gas outlet. This pressure drop (e.g., the upstream side of the gap at lower pressure than the downstream side) may "pull" (the gas) against the "push" imparted by the spray on the gas through the gap or throat, which may reduce the acceleration of the gas by the spray (e.g., within the throat). In some embodiments, gas flow rate through gap 430 may be controlled by controlling injector 120 and/or mount 130. In an exemplary embodiment, inner wall 420 is configured to be an inner chamber having a gas outlet, disposed within an outer chamber having a gas inlet, the inner and outer chambers are in fluidic communication via a gap 430 in inner wall 420, and gas flows from the gas inlet into the outer chamber, then through the gap into the inner chamber, then through the inner chamber to the gas outlet. Expected gas flow rate into the outer chamber may be used to determine an appropriate combination of spray 150 and gap area, such that gas flow from the outer chamber into the inner chamber, via gap 430, may be matched to (e.g., be within +/−50% of) the expected gas flow rate into the outer chamber. Adjusting the momentum imparted by spray 150 to the gas may be used to control gas flow rate (and/or pressure) from the outer chamber (having the gas inlet), into the inner chamber (having the gas outlet).

In some embodiments, gap 430 is annular (e.g., for a conical spray 150). Gap 430 may be elliptical and/or rectangular (e.g., for a fan shaped spray). Gap 430 may be circular (e.g., for a spray having a circular cross section). For some fan shaped sprays, the aspect ratio of the cross section of the spray increases with distance from the spray nozzle. In some embodiments, distance 450 (FIG. 4) may be with +/−50%, +/−20%, or even +/−10% of gap height 510. In some implementations, distance 450 may be less than five times gap height 510, less than three times gap height 510, less than twice gap height 510, less than gap height 510, or even less than 50% of gap height 510, Distance 450 may be greater than 10% of gap height 510, greater than 50% of gap height 510, greater than gap height 510, or even greater than vice gap height 510.

A gap 430 may be chosen to match an aspect ratio of a cross section of a spray (e.g., an elliptical cross section for a fan shaped spray), in some cases, gap height 510 may be greater than three times gap width 440, greater than five times gap width 440, greater than ten times gap width 440, or even greater than 20 times gap width 440.

Figure 6A:
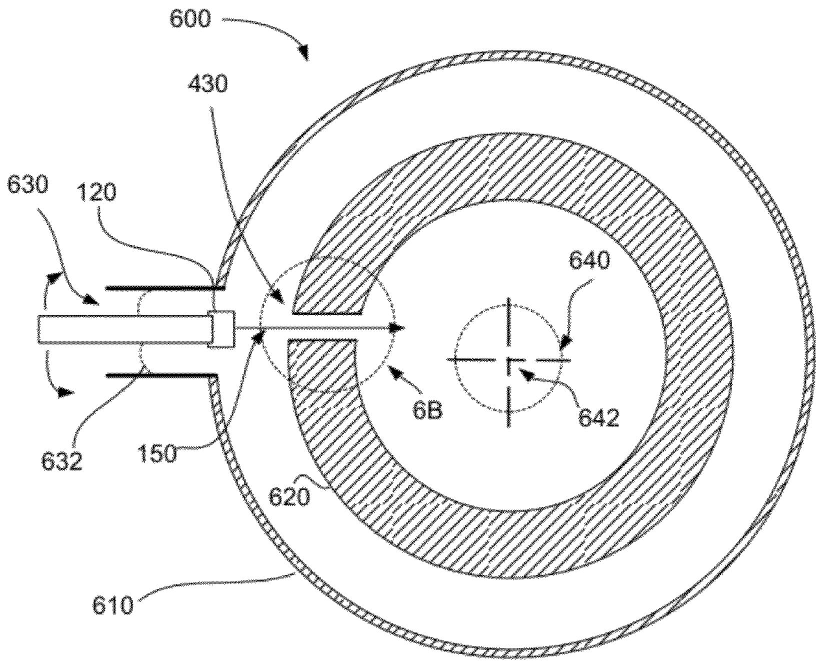
FIG. 6A is a diagrammatic representation of an apparatus, according to some embodiments.

FIG. 6A is a diagrammatic representation of an apparatus, according to some embodiments. System 600 includes a chamber 610 configured to contain a gas. Chamber 610 may include a gas inlet 630 (which may also be used as a gas outlet for flow in the opposite direction). System 600 includes an inner wall 620 within chamber 610. Inner wall 620 forms an inner chamber configured to contain a gas, and may include a gas outlet 640 (which may be coaxial with a cylindrical axis 642).

Inner wall 620 includes a gap 430, which may convey gas and/or liquid from one side of inner wail 620 to the other (e.g., into or out of the "inner chamber"). System 600 includes an injector 120 configured to inject a liquid spray 150 through gap 430 into an interior volume defined by inner wall 620. Injector 120 may spray liquid spray 150 into the inner chamber as shown). In some embodiments, an injector may spray a liquid spray "out of" a chamber.

Injector 120 may be disposed with mount 632, which may provide for adjusting the direction of spray 150, fore/aft movement of injector 120, and the like. In some embodiments, an injector mount may also include a gas inlet and/or a gas outlet.

A chamber may be cylindrical. In system 600, chamber 610 is a cylinder, and is at least partially defined by cylindrical axis 642. An inner and outer chamber may be concentric. In exemplary system 600, chamber 610 and inner wall 620 are concentric cylindrical chambers about cylindrical axis 640. Cylindrical axis 640 may pass through an end wall or cap (not shown) of a cylindrical chamber. In some embodiments, only an inner or only an outer chamber is cylindrical. In some embodiments, inner and outer cylindrical chambers may be defined by different cylindrical axes (e.g., not be concentric). In some embodiments, an outer chamber is rectangular and an inner chamber is cylindrical.

Figure 6B:
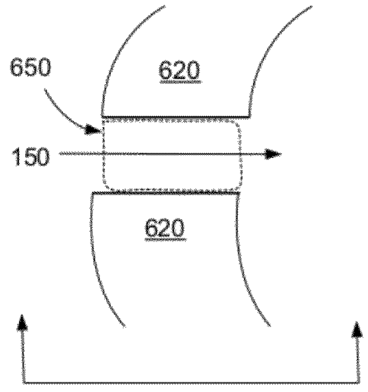
FIG. 6B is a schematic enlargement of the gap and spray region, as shown in FIG. 6A.

FIG. 6B is a schematic enlargement of the gap and spray region, as shown in FIG. 6A. Gap 430 may have a gap depth (e.g., a length in the spray direction) that combines with a height and width of the gap (not shown) to define a throat 650 through which spray 150 passes. In FIG. 6B, throat 650 is viewed from a direction orthogonal to the spray direction (e.g., from above). A throat may have a length in a direction characterizing a spray that is sprayed through the throat that is larger than at least one dimension characterizing a thickness of the spray (e.g., orthogonal to the spray direction). In an exemplary embodiment, a fan shaped spray may have a width (e.g., the thin dimension in cross section) that is a few morn (as measured at the gap) and a throat through which the spray is injected has a length of more than 1 cm, including more than 10 cm. In some cases, a throat length is larger than the thinnest spray dimension. In some cases, the throat length is more than 10× larger, or even more than 100× larger, than the thinnest spray dimension.

Referring back to FIG. 6A system 600 may be configured such that spray 150 is injected into throat 650 within inner all 620 at a velocity such that a substantial portion of deceleration zone 170 (FIG. 1) is within throat 650. In some embodiments, a spray decelerates to a terminal velocity within throat 650. In some embodiments, a spray may decelerate to a terminal velocity before reaching gap 430.

Figure 6C:
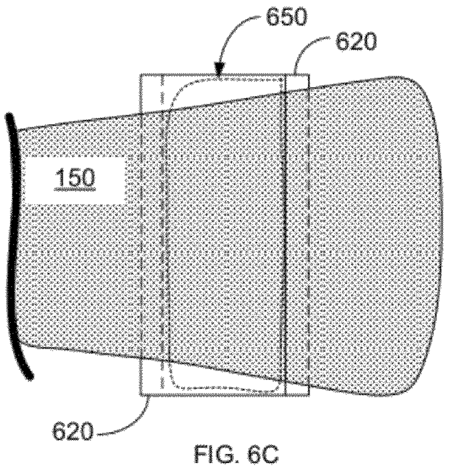
FIG. 6C is another view of a portion of system 600, as annotated in FIG. 6B, according to some embodiments.

FIG. 6C is another view of a portion of system 600, as annotated in FIG. 6B, according to some embodiments. In some embodiments, throat 650 may be shaped to match are expected shape of spray 150 as it passes through throat 650. An exemplary fan-shaped spray may pass through a fan shaped throat. In some cases, it may be convenient to fabricate a throat shape that approximates a spray shape. In FIG. 6B, spray 150 is fan shaped and throat 650 is approximately rectangular. Spray 150 is illustrated as an "arrow" for convenience. In some cases, spray 150 may be very thin (e.g., look like a line as viewed from a direction orthogonal to the spray direction). In some cases, spray 150 may fan or otherwise diverge after leaving spray nozzle 120. In exemplary system 600 (FIG. 6A), spray 150 may have a spray width (e.g., from top to bottom of the page as viewed in FIG. 6A) that matches the width of gap 430 in the same direction. Spray 150 and gap 430 may be sized (in respective directions) such that spray 150 substantially "fills"; gap 430 as it passes through gap 430.

In some cases, a volume of a deceleration zone may be demarcated by the spray boundary in a lateral direction with respect to the nozzle) and a distance from the nozzle at which the spray reaches terminal velocity. In some embodiments, more than 80%, 90%, 95%, or even 99% of the volume of the deceleration zone is within throat 650. In some embodiments, more than 80%, 90%, 95%, or even 99% of the volume of the deceleration zone is within an inner chamber (e.g., as defined by inner wall 620 in FIG. 6). In some embodiments, more than 80%, 90%, 95%, or even 99% of the volume of the deceleration zone is on an opposite side (with respect to the injector) of the inner wall having the gap through which the injector injects the spray.

In some cases, a distance between the interior of chamber 610 and inner wall 620 is less than the diameter of chamber 610, less than 50% of the diameter of chamber 610, less than 20% of the diameter of chamber 610, or even less than 10% of the diameter of chamber 610.

Injector 120 and gap 430 may be arranged to direct spray 150 at an angle with respect to inner wall 620. In some cases, an angle may be between 5 and 30 degrees. An angle may be between 10 and 45 degrees. An angle may be between 40 and 140 degrees. An angle may be between 70 degrees and 110 degrees. For a cylindrical inner wall 620, injector 120 and gap 430 may be configured such that spray 150 may cause a circumferential circulation of gas around a cylindrical axis 640. In some embodiments, inner wall 620 is axisymmetric about cylindrical axis 640, and injector 120 and gap 430 are configured to direct spray 150 at cylindrical axis 640. In some embodiments, inner wall 620 is axisymmetric about cylindrical axis 640, and injector 120 and gap 430 are configured to direct spray 150 in a tangential direction with respect to cylindrical axis 640 (e.g., to create a helical, circumferential, cyclonic, or otherwise circulatory flow pattern).

An injection angle (e.g., with respect to a cylindrical wall) may be chosen according to a desired interaction between an injected liquid and the gas. In some cases, injecting a shallow angle (relative to a cylindrical wall) may increase the "torque" imparted by the liquid to a gas circulating about an axis (e.g., increasing the effect of injection momentum on cyclone velocity). In some embodiments, injecting at a steep angle may induce turbulence within an inner chamber, which may enhance reactions in some implementations.

Figure 7:
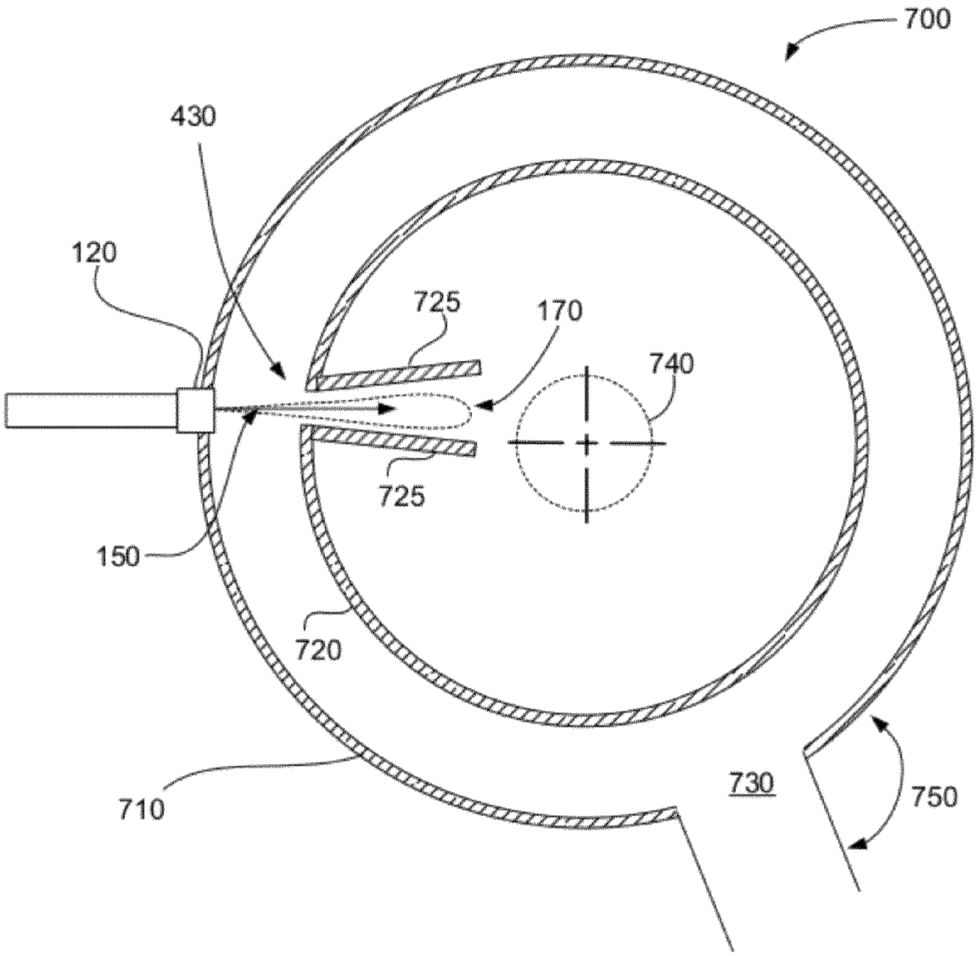
FIG. 7 is a diagrammatic representation of an apparatus, according to some embodiments.

FIG. 7 is a diagrammatic representation of an apparatus, according to some embodiments. System 700 may include an outer chamber 710 and an inner chamber 720. Outer chamber 710 and inner chamber 720 may be cylindrical, and may be concentric. Outer chamber 710 may include a gas inlet 730 (e.g., in a ceiling of outer chamber 710), and inner chamber 720 may include a gas outlet 740 (e.g., in a floor of inner chamber 720). Inner chamber 720 and outer chamber 710 may be in fluidic communication via gap 430. In an exemplary configuration, gas is received into outer chamber 710 via gas inlet 730, passes into inner chamber 720 via gap 430, then exits system 700 via gas outlet 740 (e.g., passing through a tube through outer chamber 710). The annotation of a feature as an "inlet" or an "outlet" does not generally preclude operation with a reverse gas flow (an inlet can be an outlet, and an outlet can be in inlet).

Various angles of gas inlets and outlets (e.g., angle 750) may be chosen according to expected gas flow characteristics within the respective chambers. In some embodiments, a cylindrical chamber includes a gas inlet or outlet located near (or even aligned with) the cylindrical axis defining the chamber. For some concentric chamber configurations, a gas inlet into outer chamber 710 and a gas outlet from inner chamber 720 are both aligned with the cylindrical axis defining the outer and inner chambers. In an exemplary embodiment, outer chamber 710 includes a gas inlet 730 and inner chamber 720 includes a gas outlet 740, and gas passes from outer chamber 710 to inner chamber 720 via gap 430.

System 700 may include an injector 120 configured to inject a spray 150 from outer chamber 710, through gap 430, into inner chamber 720. Inner chamber 720 may include one or more guide surfaces 725 that "extend" gap 430 into inner chamber 720. Guide surfaces 725 may extend substantially parallel to the spray direction(s) at gap 430. The shape of the one or more guides surfaces 725 may be chosen to match an expected shape of liquid spray 150 (e.g., a fan shaped tubular guide surface 725 to match a fan shaped spray, a hornlike and/or concentric conical guide surface(s) 725 to match a conical spray). In exemplary system 700, guide surfaces 725 form a trapezoidal shaped throat that may match a fan shaped spray 150. System 700 may be configured such that a substantial portion of deceleration zone 170 is located within the throat (e.g. within a volume defined at least in part by the width of gap 430 (not shown) and a length associated with a guide surface 725). In some cases, the "downstream boundary" of deceleration zone 170 is within a volume defined by the one or more guide surfaces (e.g. within the throat). In some embodiments, a majority of the droplets associated with spray 150 may decelerate to the terminal velocity before contacting a surface within inner chamber 720.

Figure 8:
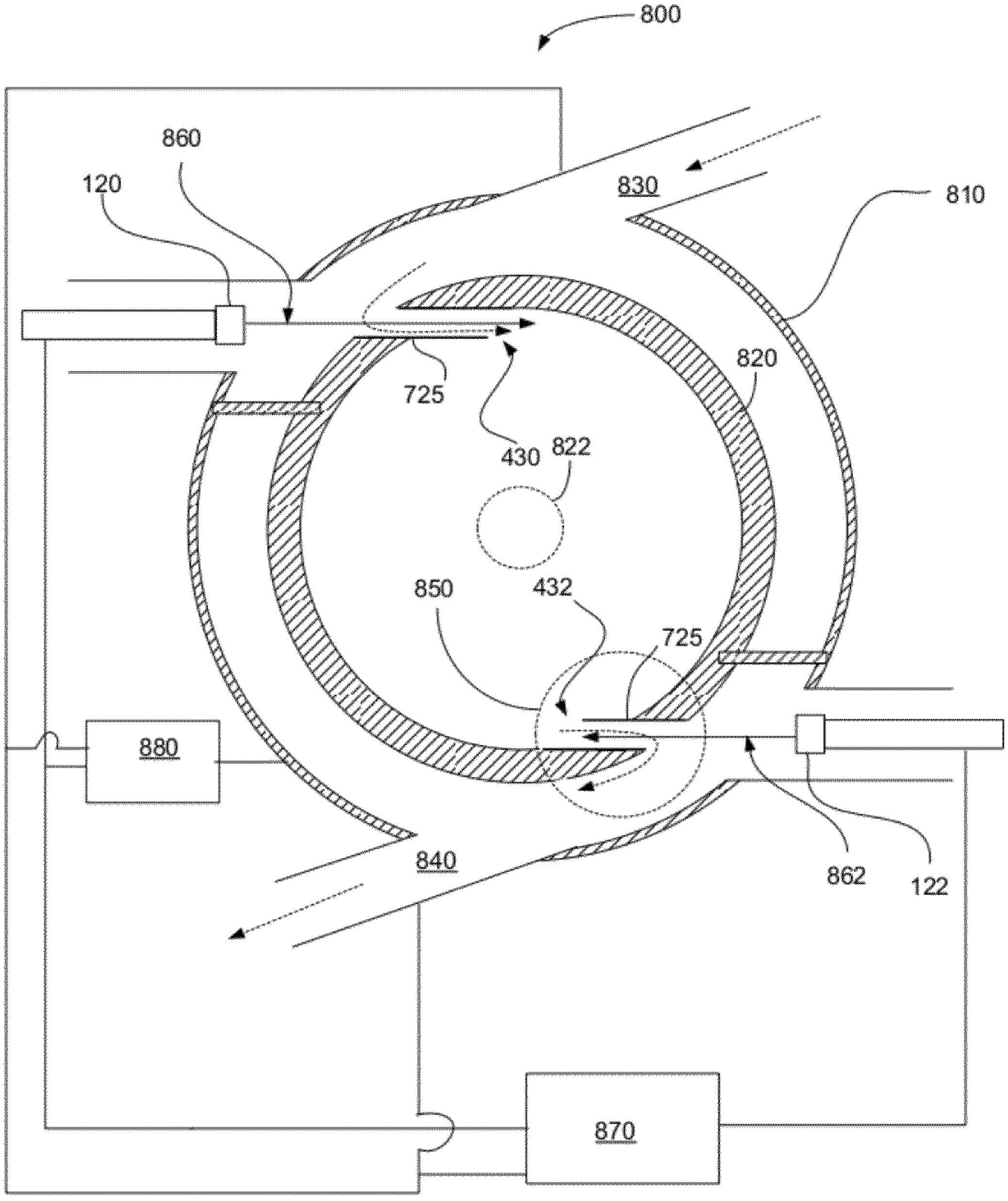
FIG. 8 is a diagrammatic representation of an exemplary multi-injector apparatus, according to some embodiments.

FIG. 8 is a diagrammatic representation of an exemplary multi-injector apparatus, according to some embodiments. Outer chamber 810 may have a circular cross section (as shown); outer chamber 810 may have a square or rectangular or other shaped cross section (not shown). Outer chamber 810 and inner chamber 820 are each configured to contain a gas. Outer chamber 810 includes a gas inlet 830 and a gas outlet 840. Outer chamber 810 and inner chamber 820 are in fluidic communication via an inlet gap 430 and an outlet gap 432. Gas inlet 830 and gas outlet 840 may be separated, such that gas passing from gas inlet 830 to gas outlet 840 must pass through inner chamber 820. In some embodiments, a gas inlet or outlet is coaxial with an injector (e.g., an injector mount may include a gas inlet or outlet).

An inlet injector 120 may inject an inlet spray 860 into outer chamber 810. An outlet injector 122 may inject an outlet spray 862 into outer chamber 810. In some embodiments, inlet spray 860 is directed through inlet gap 430 into inner chamber 820, and outlet spray 862 is directed through outlet gap 432 into inner chamber 820.

A gas stream in the outer chamber may flow from gas inlet 830 into inner chamber 820 via inlet gap 430 associated with inlet injector 120. The gas stream may flow out of inner chamber 820 to outer chamber 810 via outlet gap 432 associated with outlet injector 122. A counterflow region 850 may be associated with a gaseous volume proximate to an inlet or outlet (e.g., outlet gap 432) in which an injector injects a spray (e.g., outlet spray 862) against the predominant flow of the gas stream in that volume.

The inlet and/or outlet injectors may be configured (e.g., angled) to cause a circular or rotational flow of gas (e.g., the gas within inner chamber 820). In some configurations, both the inlet and outlet injectors circulate gas within inner chamber 820 in the same direction (e.g., clockwise or counter-clockwise). In some configurations, inlet injector 120 circulates the gas in one direction (e.g., clockwise) and outlet injector 122 circulates the gas in another direction (e.g., counterclockwise). In some embodiments, an optional drain 822 (which may include a trap that provides for liquid transport but Hocks gas flow) may provide for removal of liquid from inner chamber 821), outer chamber 810, gas inlet 830, and/or gas outlet 840. A gas inlet and/or a gas outlet may also include a drain (not shown).

A downstream flow direction may define a gas stream passing from gas inlet 830, through inlet gap 430, then through outlet gap 432 to gas outlet 840. In such a configuration, inlet injector 120 may be configured to impart a downstream momentum to the gas stream, and outlet injector 112 may be configured to impart an upstream momentum to the gas stream. Increased downstream momentum may cause an increase in gas flow rate downstream, and increased upstream momentum may cause a decrease in gas flow rate downstream.

In some embodiments, a controller 870 may be coupled to (e.g., in communication with) at least one device (e.g., inlet injector 120, outlet injector 122, a liquid source (not shown), a shutter (if so configured), a gas inlet, a gas outlet and the like). One or more sensors 880 may be included and configured to sense information (e.g., a parameter) associated with the operation of system 800. Sensor 880 may monitor a pressure difference between gas inlet 830 and gas outlet 840. In some cases, controller 880 may be configured to receive first information associated with a desired gas flow rate through outer chamber 810 and second information associated with actual gas flow rate through outer chamber 810 (e.g., via sensor 880). A difference between desired and actual gas flow rates may cause the controller to determine (e.g., calculate, request/receive from a server, and the like) a combination of inlet spray 860 and outlet spray 862 that is expected to improve agreement between desired and actual gas flow rates. The controller may then adjust at least one of the downstream momentum (imparted by inlet spray 860) and the upstream momentum (imparted by outlet spray 862) such that the actual gas flow rate matches the desired gas flow rate. In some embodiments, controller 870 operates sensor 880 and injectors 120 and 122 in a “closed loop” control protocol. Controller 870 may be configured to maintain a desired gas flow rate through system 800. Controller 870 may be configured to maintain a desired pressure difference (e.g., between gas inlet 830 and gas outlet 840). In some cases, controller 870 may maintain a pressure difference between +15 and −15 inches of water, including between 0 and 3 inches of water. In some configurations (e.g., constant flow rate), controller 870 may control at least one of injectors 120 and 122 to maintain gas inlet 830 at a pressure between 1 and 5 inches of water below that of gas outlet 840. In an exemplary configuration, gas outlet 840 is at atmospheric pressure, inner chamber 820 is at a higher pressure than atmospheric pressure (e.g., 5-15 inches of water above) and gas inlet 830 is below atmospheric pressure (e.g., 0-3 inches of water below). Injectors 120 and 122 may be operated to control at least one of the gas inlet pressure, the inner chamber pressure, and the gas outlet pressure.

Increasing velocity or volume of inlet spray 860 may decrease pressure in gas inlet 830 and increase pressure in inner chamber 820. Increasing velocity or volume of outlet spray 862 may decrease pressure in gas outlet 840 and increase pressure in inner chamber 820. In some embodiments, one or more sensors 880 and controller 870 control the pressure in at least two of gas inlet 830, inner chamber 820, and gas outlet 840.

Figure 9:
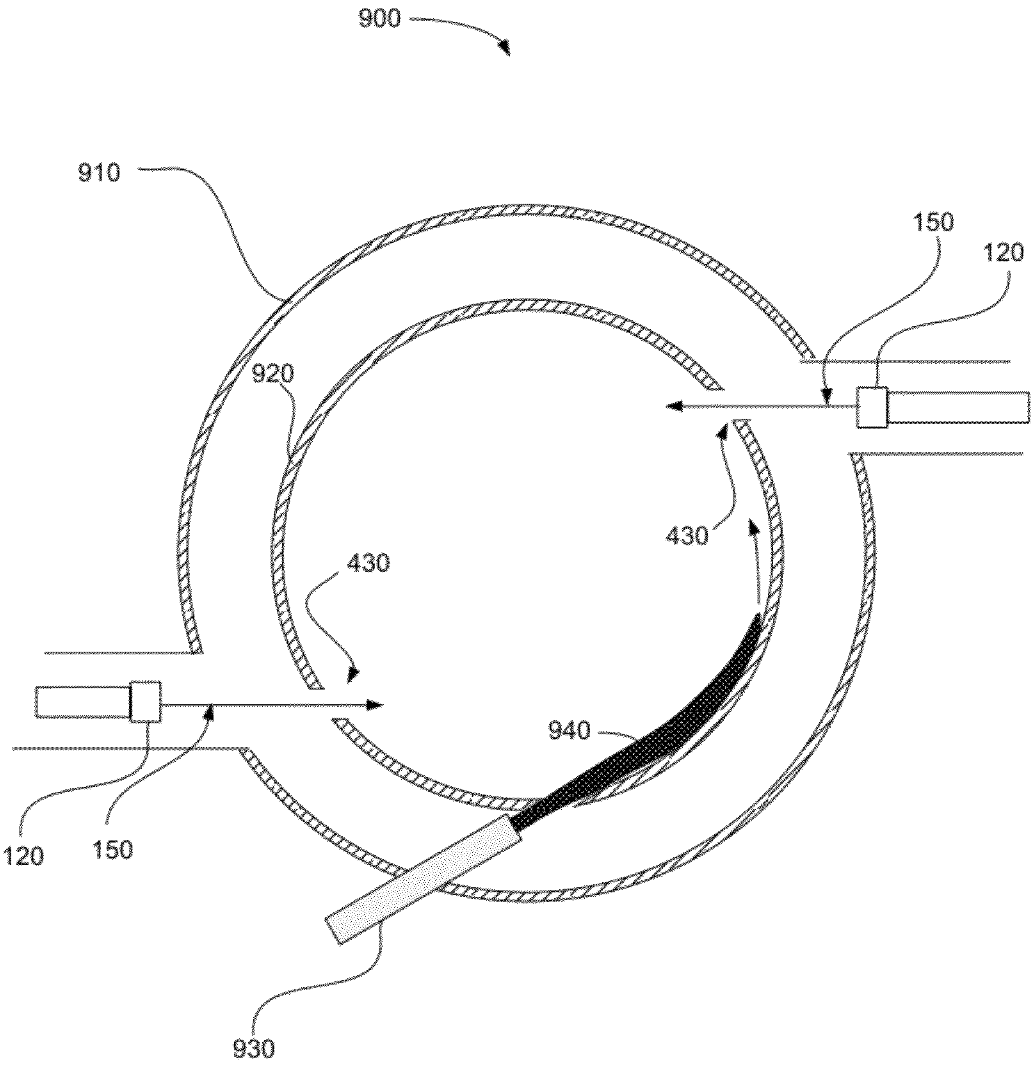
FIG. 9 is a diagrammatic representation of an apparatus, according to some embodiments.

FIG. 9 is a diagrammatic representation of an apparatus, according to some embodiments. System 900 may include an outer chamber 910 and an inner chamber 920. Outer chamber 910 may include a gas inlet and/or gas outlet (not shown). Inner chamber 920 may include a gas inlet and/or a gas outlet (not shown). System 900 includes injectors 120 configured to inject liquid sprays 150 into inner chamber 920 gaps 430, which provide fluid communication between outer chamber 910 and inner chamber 920. In some embodiments, an injector is mounted with (e.g., coaxial with) a gas inlet and/or a gas outlet into a chamber. In some embodiments, a gas inlet and/or gas outlet may be a discrete port into a chamber. System 900 may be configured with outer chamber 910 and inner chamber 920 as concentric cylinders. A gas inlet into outer chamber 910 (not shown) may be concentric with an axis describing these cylinders. A gas outlet from inner chamber 920 (not shown) may be concentric with the axis describing these cylinders. Injectors 120 may be configured to generate cyclone with outer chamber 910 and/or inner chamber 920.

Various embodiments may include one or more wash sprays, which ma), be configured to coat, clean, or minimize the deposit of material onto a surface. In exemplary system 900, washer 930 is configured to generate wash spray 940, which may comprise a liquid (e.g., water). Wash spray 940 may have a sufficiently large droplet size and velocity that a significant portion of wash spray 940 contacts a surface (e.g., the inside surface of inner chamber 920) with enough momentum to coat, clean, or otherwise reduce deposition on this surface. Washer 930 may have a nozzle shape, orifice size, and be coupled to a liquid source (not shown) that causes a liquid spray to contact the surface with a sufficiently high velocity that significant momentum is transferred from wash spray 940 to the surface impinged upon by wash spray 940. A wash spray may be directed substantially tangential to a surface. A wash spray may have a relatively large incident wash spray angle with respect to a surface (e.g., greater than 10 degrees, 20 degrees, 40 degrees, or 60 degrees). In some embodiments, washer 930 is coupled to an inner chamber wall. In some embodiments, washer 930 is coupled to an outer chamber wall, and may inject a wash spray into an inner chamber via a wash spray gap. In some embodiments, washer 930 washes an outer surface (e.g., an outer surface of an inner chamber). Washer 930 may wash the surface associated with (e.g., around) a gap 430.

Figure 10:
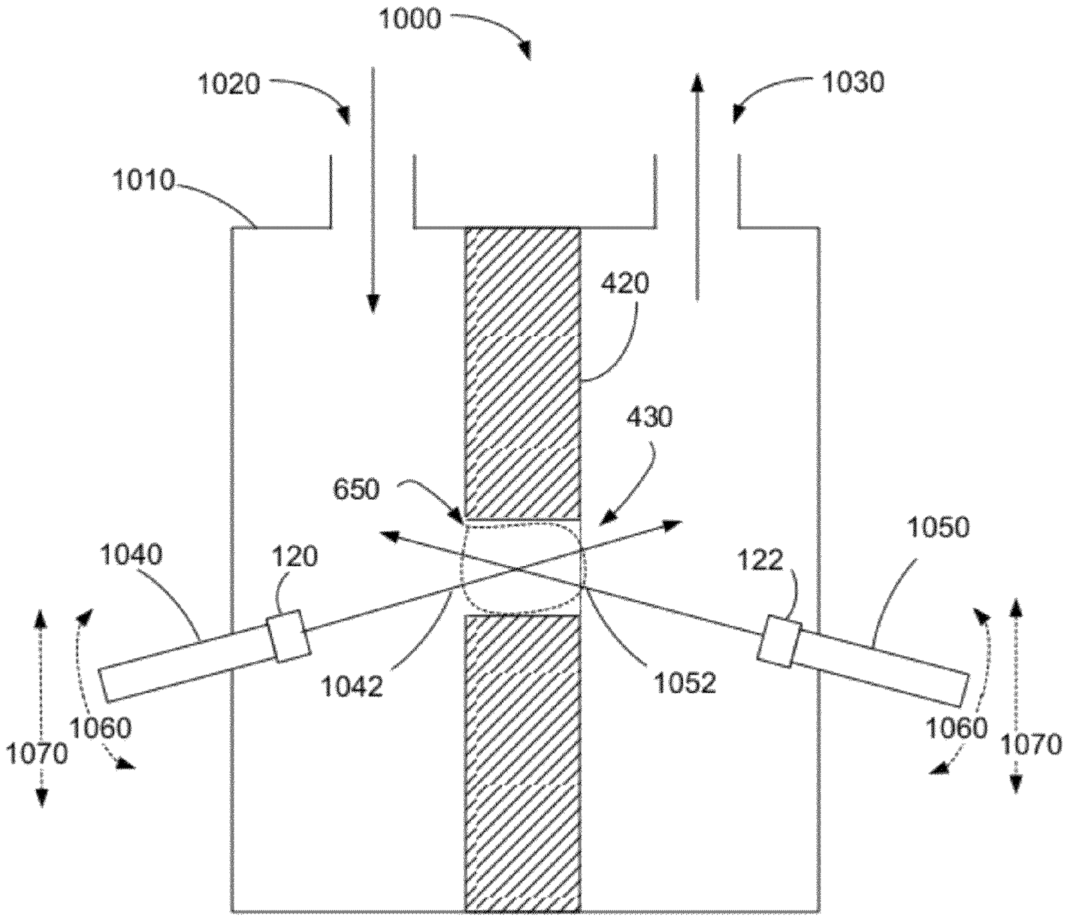
FIG. 10 is a diagrammatic representation of an apparatus, according to some embodiments.

FIG. 10 is a diagrammatic representation of an apparatus, according to some embodiments. System 1000 may include a chamber 1010 configured to contain a gas. Chamber 1010 may have a gas inlet 1020 and a gas outlet 1030, and gas may flow from gas inlet 1020 through chamber 1010 to gas outlet 1030. Chamber 1010 may include an inner wall 420 having a gap 430, through which gas flows from gas inlet 1020 to gas outlet 1030. A downstream injector 120 may be coupled (e.g., mounted with an adjustable mount 1040) to chamber 1010. Downstream injector 120 may generate a downstream spray 1042, which may be directed through gap 430 in a downstream direction. An upstream injector 122 may be coupled (e.g., mounted with an adjustable mount 1050) to chamber 1010. Upstream injector 122 may generate an upstream spray 1052, which may be directed through gap 430 in an upstream direction. Spray velocities, spray volumes, spray angles, and other parameters may be adjusted for the upstream and/or downstream injectors. In exemplary system 1000, both downstream spray 1042 and upstream spray 1052 may be directed through throat 650. In some embodiments, an injector may be configured to provide for an adjustable angle of injection 1060 and/or position 1070. A controller and sensor (not shown) may be coupled to upstream injector 122, adjustable mount 1050, downstream injector 120, and/or adjustable mount 1040, and may control gas flow rate through chamber 1010. In some embodiments, upstream spray 1052 and downstream spray 1042 are aligned substantially parallel to and against each other (not shown in FIG. 10). In some embodiments, upstream spray 1052 and downstream spray 1042 are angled into each other (e.g., as shown in FIG. 10). In some embodiments, gap 430 may be configured to have a shape that partially matches a first spray and partially matches a second spray. For example, a cross-shaped gap may comprise two intersecting rectangular gaps. A first spray may match one rectangular gap of the cross-shaped gap, and a second spray may match the other rectangular gap of the cross-shaped gap.

Figure 11:
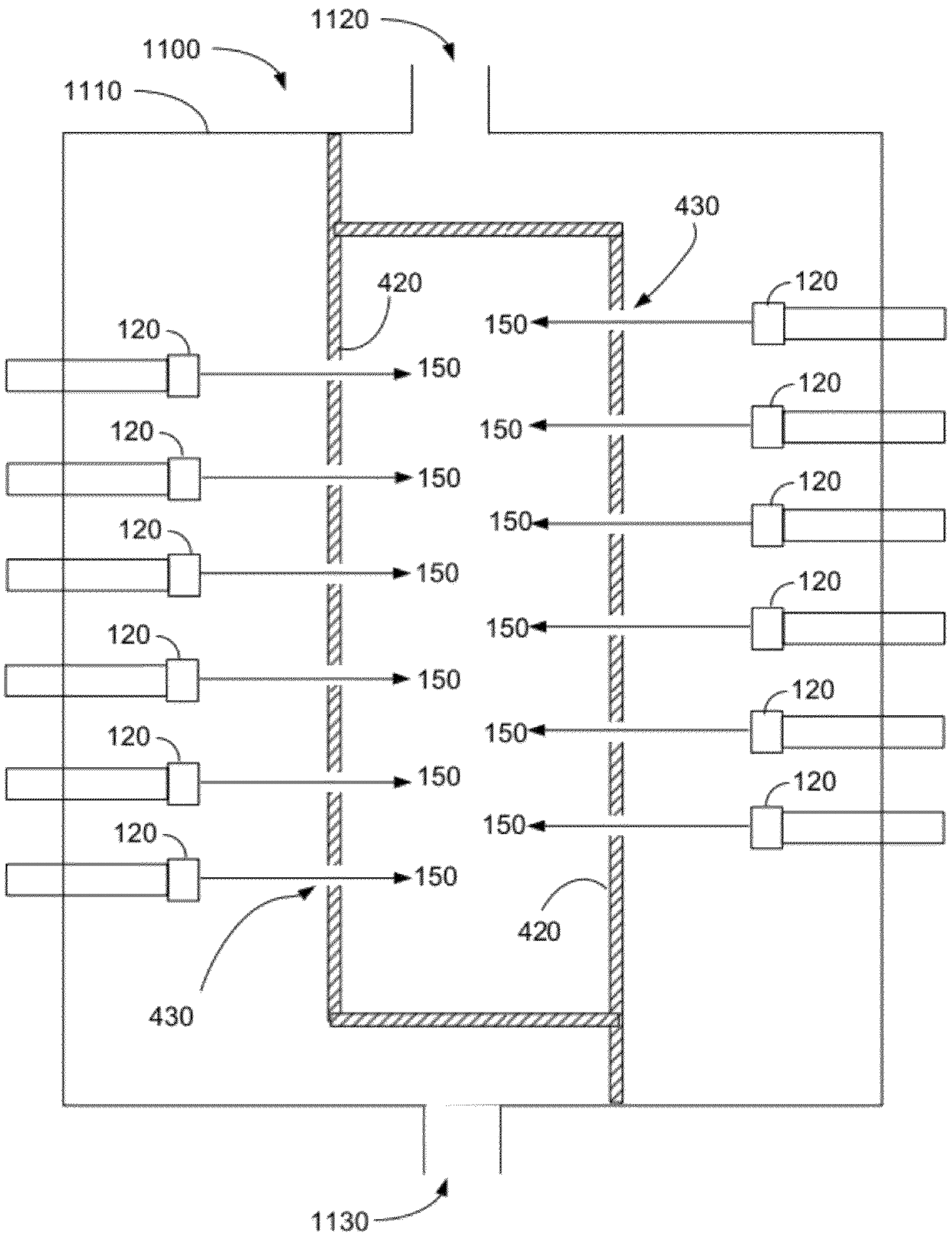
FIG. 11 is a diagrammatic representation of an apparatus, according to some embodiments.

FIG. 11 is a diagrammatic representation of an apparatus, according to some embodiments. System 1100 min, include a chamber 1110 configured to contain gas. Chamber 1110 may include a gas inlet 1120 and a gas outlet 1130. System 1110 may include a plurality of injectors 120 configured to generate a plurality of sprays 150. One or more inner walls 420 may include a plurality of gaps 430, through which sprays 150 are sprayed by injectors 120. In some embodiments, gas inlet 1120 and gas outlet 1130 are separated by inner walls 420, and gas passes from gas inlet 1120 to gas outlet 1130 via gaps 430. In some embodiments, inner walls 420 are discrete (e.g., baffles) and some gas may pass around inner walls 420 (e.g., from gas inlet 1120 to gas outlet 1130 without going through gaps 430). In some embodiments, one or more injectors is mounted using an adjustable mount (not shown). Some injectors 120 may be configured to generate sprays that are substantially parallel to each other (e.g., fan shaped sprays, each defined by an orthogonal to its "fan plane" for which the orthogonals are substantially parallel). Some injectors 120 may be configured to inject sprays 150 in substantially the same direction. Some injectors 120 may be configured to inject sprays 150 in substantially opposite directions (e.g., at each other). Some injectors 120 may be configured to generate sprays that intersect the sprays of other injectors 120.

Figure 12A:
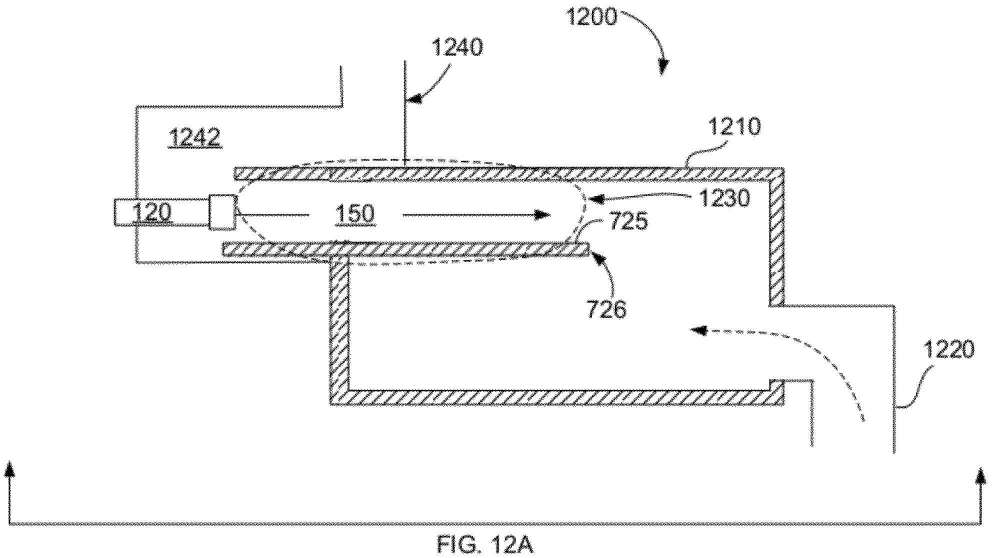
FIG. 12A illustrates an apparatus according to some embodiments.

FIG. 12A illustrates an apparatus according to some embodiments. Apparatus 1200 includes a chamber 1210 configured to contain a gas. Gas may enter chamber 1210 via gas inlet 1220. Gas may exit chamber 1210 by passing through throat 1230 to gas outlet 1240. In this example, throat 1230 is at least partially defined by guide surface 725. Injector 120 injects spray 150 into chamber 1210 via throat 1230 (viewed in this FIG. from a direction orthogonal to the spray direction of spray 150). In exemplary system 1200, injector 120 generates a fan shaped spray, and throat 1230 is a fan-shaped cavity. An edge 726 of guide surface 725 may demarcate an end of throat 1230 with respect to spray 150. In some cases, spray 150 decelerates to a terminal velocity before passing past edge 776.

Figure 12B:
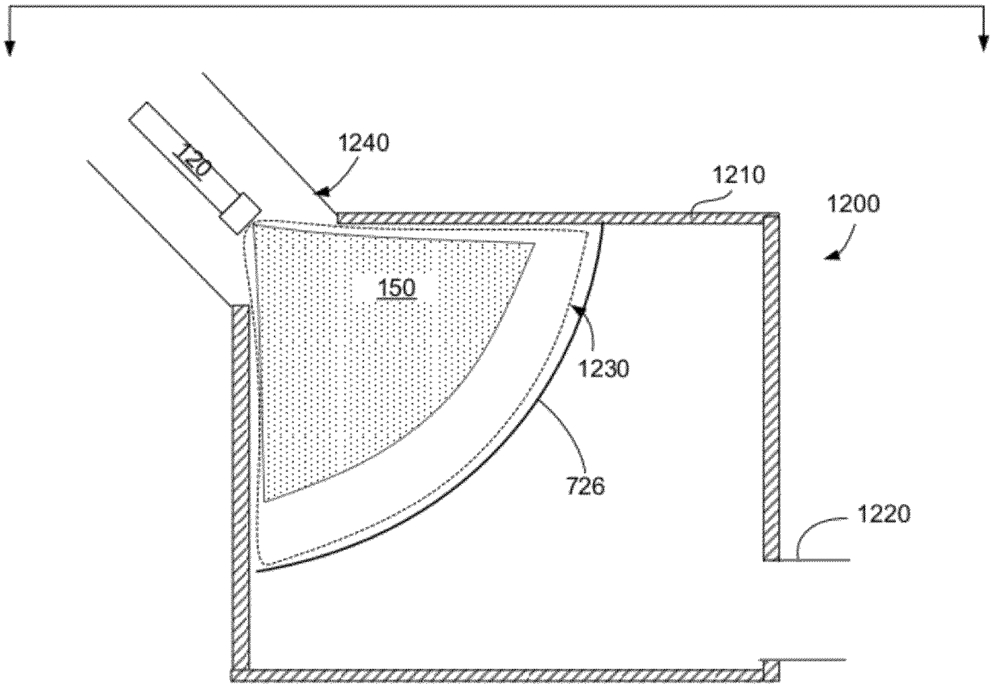
FIG. 12B illustrates an apparatus according to some embodiments.

FIG. 12B illustrates a different view of apparatus 1200, according to some embodiments. FIG. 12B illustrates a view of apparatus 1200 as annotated in FIG. 12A (and vice versa), and shows another view of throat 1230 (viewed from another orthogonal direction with respect to the spray direction). In an exemplary implementation, FIG. 12A may be a view downward (from the top) and FIG. 12B may be a view from the front. In this example, walls of chamber 1210 and guide surface 725 (FIG. 12A) form a fan-shaped throat 1230, which substantially matches the fan shape (in this embodiment) of liquid spray 150.

Figure 13:
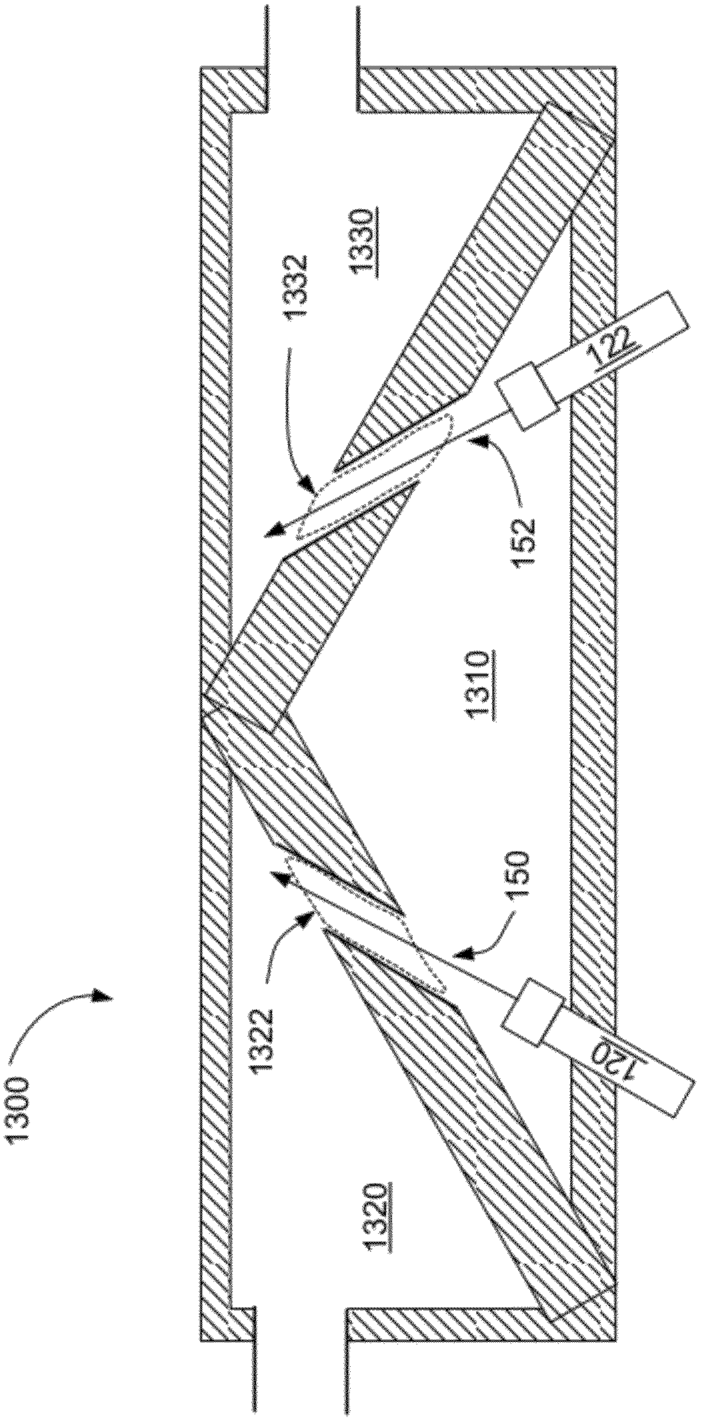
FIG. 13 illustrates an apparatus, according to some embodiments.

FIG. 13 illustrates an apparatus, according to some embodiments. Apparatus 1300 includes chamber 1310, which is configured to contain a gas. Chamber 1310 is in fluidic communication with inlet 1320 via throat 1322. Chamber 1310 is in fluidic communication with outlet 1330 via throat 1332. Inlet injector 120 and outlet injector 122 are disposed in chamber 1310. Inlet injector 120 is configured to inject liquid spray 150 into gas inlet 1320. Outlet injector 122 is configured to inject liquid spray 152 into gas outlet 1330. Gas may flow from the gas inlet 1320, through throat 1322 into chamber 1310, then through throat 1332 to gas outlet 1330. Gas may flow in the opposite direction. The relative momenta (e.g., spray velocities, liquid volumes) of one or more of liquid sprays 150 and 152 may be adjusted to control gas flow through system 1300. In some configurations (e.g., at constant flow rate), the relative momenta may be used to control the gas pressures within one or more of gas inlet 1320, chamber 1310, and gas outlet 1330.

Figure 14:
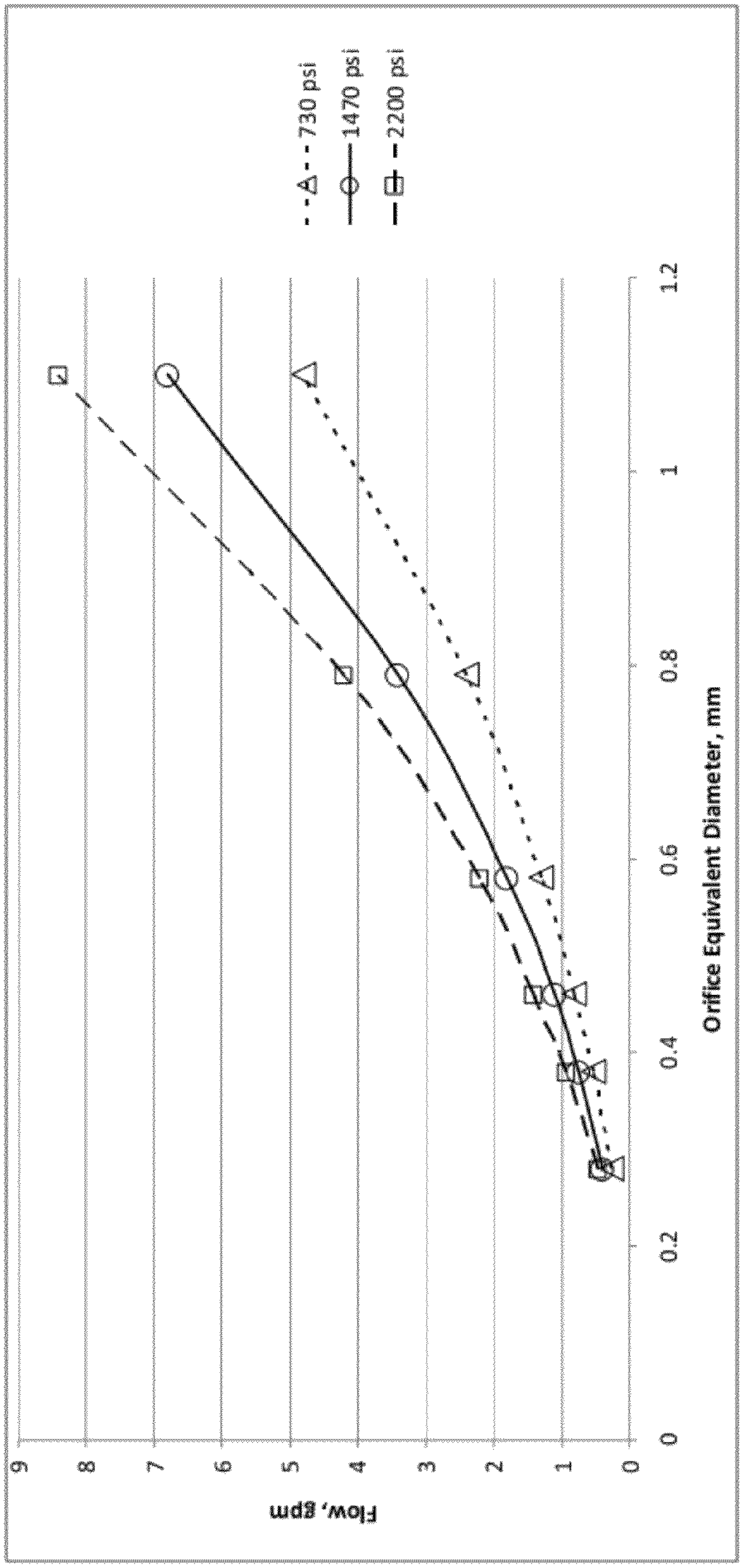
FIG. 14 is a diagrammatic representation of some representative correlations among equivalent orifice diameter, liquid pressure, and pump rate, according to some embodiments.

Systems may be sized according to a desired flow rate and volume of gas to be controlled and/or abated. In some cases, a desired droplet size may be used to choose a combination of pressure and injector orifice size that yields the desired droplet size. In some cases, total momentum of sprayed liquid may be increased (e.g., adapted from a smaller system to a larger system) by increasing orifice size, pressure, and/or pumping volume of a liquid source. In some cases, momentum may be increased by increasing the number of injectors. Table 1 lists several part numbers of exemplary spray nozzles available from Spraying Systems Company (Wheaton, Ill.) and several representative approximate flow rates (for various orifice sizes) at different liquid source pressures. For convenience, many spray nozzles (e.g., having a non-circular orifice shape) may be characterized by an Orifice Equivalent Diameter (OED). FIG. 14 is a diagrammatic representation of some representative correlations among OED, liquid pressure, and pump rate, according to some embodiments.

TABLE 1

| Part # | Orifice Equivalent Diameter, mm | Area, mm$^2$ | Flow at: 730 psi | 1470 psi | 2200 psi |
|---|---|---|---|---|---|
| 1100017-TC | 0.28 | 0.061152 | 0.27 | 0.39 | 0.47 |
| 1100033-TC | 0.38 | 0.112632 | 0.53 | 0.75 | 0.92 |
| 1100050-TC | 0.46 | 0.165048 | 0.81 | 1.1 | 1.4 |
| 1100080-TC | 0.58 | 0.262392 | 1.3 | 1.8 | 2.2 |
| 110015-TC | 0.79 | 0.486798 | 2.4 | 3.4 | 4.2 |
| 11003-TC | 1.1 | 0.9438 | 4.8 | 6.8 | 8.4 |

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. An apparatus for removing contaminants from a gas stream, the apparatus comprising:

a chamber comprising an interior surface and configured to contain a gas; the chamber having a gas inlet and a gas outlet;

a first liquid source configured to deliver a first liquid at a first pressure greater than 500 psi;

a first injector coupled to the chamber and the first liquid source, the first injector configured to receive the first liquid from the first liquid source and to inject the received first liquid into the chamber, the first injector including a first nozzle having:

a first orifice having a first size that does not exceed 0.01 square inches of orifice area; and a first shape configured to generate a spray of droplets of liquid;

the first injector and the first pressure configured to cause the first liquid to form a first liquid spray upon being sprayed from the first orifice into the chamber, the first liquid spray comprising droplets of the first liquid having a first spray velocity;

the chamber, the first liquid source, and the first injector configured such that a majority of the droplets within the first liquid spray decelerate from the first spray velocity to a terminal spray velocity that is less than 10% of the first spray velocity before contacting the interior surface of the chamber.

2. The apparatus of claim 1, wherein the first spray velocity is greater than 400 feet per second, and the terminal spray velocity is less than 0.1 feet per second.

3. The apparatus of claim 1, further comprising an inner wall within the chamber, the inner wall having a first gap through the inner wall, the first gap having a first gap width and a first gap height;

wherein:

the first injector is further configured to inject the first liquid spray through the first gap.

4. The apparatus of claim 3, wherein:

the first nozzle has a first shape that is configured to form the received first liquid into a fan-shaped first liquid spray having a first spray height at the inner wall that is greater than five times the first spray width, the first gap height is greater than five times the first gap width; and the first injector is configured to align the first spray width with the first gap width and the first spray height with the first gap height.

5. The apparatus of claim 4, wherein:

the first spray height at the inner wall is greater than ten times the first spray width; and the first gap height is greater than ten times the first gap width.

6. The apparatus of claim 4, wherein a first distance from the first nozzle to the first gap is less than one foot.

7. The apparatus of claim 4, wherein a first distance from the first nozzle to the first gap is less than two times the first gap height and greater than 10% of the first gap height.

8. The apparatus of claim 3, wherein:

the first liquid spray has a first spray height and a first spray width, as measured at the first gap; and the first gap height is between 70% and 130% of the first spray height, and the first gap width is between 70% and 130% of the first spray width.

9. The apparatus of claim 3, wherein the inner wall forms an inner chamber within the chamber, and the first gap delivers the gas into or out of the inner chamber.

10. The apparatus of claim 3, wherein the inner wall separates the gas inlet from the gas outlet.

11. The apparatus of claim 1, wherein the first pressure of the first liquid is greater than 1000 psi.

12. The apparatus of claim 1, wherein the first pressure is greater than 1000 psi and the first size does not exceed 0.008 square inches of orifice area.

13. The apparatus of claim 1, wherein the first orifice is elliptical, having a major length at least three times a minor length, and the major length is below 0.05 inches.

14. The apparatus of claim 3, wherein at least a portion of the inner wall forms an inner chamber that is cylindrical about an axis, and the first injector is further configured to inject the first liquid in a manner that causes the gas within the portion to circulate circumferentially about the axis.

15. The apparatus of claim 14, wherein the inner chamber further comprises at least one of a gas inlet and a gas outlet that is disposed in an end of the inner chamber intersected by the axis, in a location proximate to the intersection of the axis with the end.

16. The apparatus of claim 1, wherein:

at least a portion of the chamber is cylindrical about an axis; and the first nozzle generates a fan-shaped spray having a first spray height greater than a first spray width, the first spray height oriented substantially parallel to the axis.

17. The apparatus of claim 3, wherein the inner wall separates the gas inlet from the gas outlet, the apparatus further comprising:

a second gap through the inner wall;

a second liquid source configured to deliver a second liquid, at a second pressure;

a second injector coupled to the chamber and the second liquid source, the second injector configured to receive the second liquid from the second liquid source and to inject the received second liquid through the second gap, the second injector including a second nozzle having:

a second orifice having a second size and second shape, the second nozzle and second pressure configured to cause the second liquid to form a second liquid spray upon being injected from the second orifice.

18. The apparatus of claim 17, wherein the first gap and second gap are different gaps.

19. The apparatus of claim 17, wherein, with respect to a flow of gas from the gas inlet to the gas outlet:

the first injector is configured to inject the first liquid spray in a downstream direction through the first gap; and the second injector is configured to inject the second liquid spray in an upstream direction through the second gap.

20. The apparatus of claim 17, wherein:

the inner wall forms a cylindrical inner chamber inside the chamber, the cylindrical inner chamber having an axis, and with respect to a circulation direction about the axis, and the first and second injectors are configured to push the gas in the circulation direction.

21. The apparatus of claim 17, wherein the inner wall forms an inner chamber inside the chamber, the inner wall having first and second gaps through the inner wall into the inner chamber, the first gap configured as a gas inlet into the inner chamber, the second gap configured as a gas outlet from the inner chamber, the first injector configured to inject the first liquid through the first gap into the inner chamber, the second injector configured to inject the second liquid through the second gap into the inner chamber.

22. The apparatus of claim 17, further comprising:

a control mechanism coupled to at least one of the first and second injectors, the control mechanism configured to control at least one of the first and second liquid sprays; and a sensor coupled the control mechanism, the sensor configured to sense at least one of a gas flow rate, a liquid flow rate, a gas pressure, and a particle concentration, the control mechanism further configured to receive an input from the sensor and control the at least one of the first and second liquid sprays in response to the input.

23. The apparatus of claim 1, wherein:

the chamber includes:

a chamber wall separating an interior of the chamber from an exterior of the chamber, a throat through the chamber wall providing for fluidic communication between the interior and exterior of the chamber;

the first injector sprays the first liquid spray through the throat; and the droplets enter the throat at a velocity higher than the terminal spray velocity and decelerate to the terminal spray velocity before exiting the throat.

24. The apparatus of claim 10, further comprising:

a controller coupled to the first injector, the controller configured to control the first liquid spray; and a sensor coupled the controller, the sensor configured to sense at least one of a gas flow rate, a liquid flow rate, a gas pressure, and a particle concentration, the controller further configured to receive an input from the sensor and control the first liquid spray in response to the input.

25. The apparatus of claim 23, wherein the chamber wall includes the interior surface.

26. An apparatus for controlling flow rate of a gas stream, the apparatus comprising a chamber configured to contain a gas, the chamber having a gas inlet to deliver the gas into the chamber and a gas outlet to convey the gas out of the chamber, a gas flow through the chamber characterized by a downstream direction from the gas inlet to the gas outlet and an upstream direction from the gas outlet to the gas inlet;

an inner wall separating the gas inlet from the gas outlet, the inner wall having a first gap and a second gap, the first and second gaps providing for the only fluidic communication between the gas inlet and gas outlet;

a first liquid source configured to deliver a first liquid at a first pressure greater than 500 psi;

a first injector coupled to the chamber and the first liquid source, and configured to spray the first liquid into the chamber through the first gap at a first velocity that imparts a downstream momentum to the gas in the chamber, the first injector including a first nozzle having:

a first orifice having a first size that does not exceed 0.01 square inches of orifice area; and a first shape configured to generate a spray of droplets of liquid;

a second injector coupled to the chamber and configured to spray a second liquid into the chamber through the second gap at a second velocity that imparts an upstream momentum to the gas in the chamber;

a sensor coupled to at least one of the chamber, the first injector, and the second injector, the sensor configured to measure a control parameter of the gas flow through the chamber; and a controller coupled to the sensor and at least one of the first and second injectors, the controller configured to receive the control parameter and adjust at least one of the first velocity of the first liquid sprayed from the first injector and the second velocity of the second liquid sprayed from the second injector in response to the received control parameter.

27. The apparatus of claim 26, wherein the control parameter includes at least one of a gas flow rate, a liquid flow rate, a pressure, and a contaminant count.

28. The apparatus of claim 26, wherein the inner wall forms an inner chamber that is cylindrical about an axis, the first injector is configured to cause the gas to circulate in a circumferential direction about the axis.

29. The apparatus of claim 28, wherein the second injector is configured to cause the gas to circulate in the circumferential direction about the axis.

30. The apparatus of claim 26, wherein the inner wall forms an inner chamber that is cylindrical about an axis, and each of the first and second injectors comprises a fan nozzle configured to generate a fan-shaped liquid spray, the fan shaped liquid spray having a spray height oriented parallel to the axis.

31. The apparatus of claim 1, wherein the first liquid source comprises a pump having metallic pumping components.

32. The apparatus of claim 1, wherein the first size is less than 0.003 square inches area.

33. The apparatus of claim 1, wherein the first orifice has an orifice equivalent diameter that is at least 0.28 mm and does not exceed 1.1 mm.

34. The apparatus of claim 1, further comprising:

a second liquid source configured to deliver a second liquid at a second pressure;

a second injector coupled to the chamber and the second liquid source, the second injector configured to receive the second liquid from the second liquid source and to inject the received second liquid into the chamber.

35. The apparatus of claim 1, wherein the first liquid source is configured to deliver the first liquid at a pressure greater than 2,000 psi.

36. The apparatus of claim 26, wherein the first size is less than 0.003 square inches area.

37. The apparatus of claim 26, wherein the first liquid source is configured to deliver the first liquid at a pressure greater than 1000 psi.

* * * * *